US 7,672,894 B2

(12) United States Patent
Rebane et al.

(10) Patent No.: US 7,672,894 B2
(45) Date of Patent: Mar. 2, 2010

(54) AUTOMATED BIDDING SYSTEM FOR USE WITH ONLINE AUCTIONS

(75) Inventors: George Rebane, Nevada City, CA (US); Keith Allen Dutton, Ojai, CA (US); Haitao Wang, Cerritos, CA (US)

(73) Assignee: Shopzilla, Inc., Los Angeles, CA (US)

( * ) Notice: Subject to any disclaimer, the term of this patent is extended or adjusted under 35 U.S.C. 154(b) by 1463 days.

(21) Appl. No.: 10/201,118

(22) Filed: Jul. 22, 2002

(65) Prior Publication Data
US 2004/0088241 A1 May 6, 2004

Related U.S. Application Data

(60) Provisional application No. 60/307,080, filed on Jul. 20, 2001.

(51) Int. Cl.
*G06Q 40/00* (2006.01)

(52) U.S. Cl. ...................................................... 705/37
(58) Field of Classification Search .................... 705/37
See application file for complete search history.

(56) References Cited

U.S. PATENT DOCUMENTS

| 6,269,361 | B1* | 7/2001 | Davis et al. ..................... 707/3 |
| 6,609,112 | B1* | 8/2003 | Boarman et al. ............... 705/37 |
| 6,907,566 | B1* | 6/2005 | McElfresh et al. .......... 715/210 |
| 7,035,812 | B2* | 4/2006 | Meisel et al. ................. 705/14 |
| 7,043,450 | B2* | 5/2006 | Velez et al. .................... 705/37 |
| 7,130,789 | B2* | 10/2006 | Glodjo et al. ................. 705/37 |
| 7,184,984 | B2* | 2/2007 | Glodjo et al. ................. 705/37 |
| 2002/0013763 | A1* | 1/2002 | Harris .......................... 705/38 |
| 2002/0091624 | A1* | 7/2002 | Glodjo et al. ................. 705/37 |
| 2002/0147675 | A1* | 10/2002 | Das et al. ....................... 705/37 |
| 2002/0188545 | A1* | 12/2002 | Wiesehuegel et al. ......... 705/37 |
| 2003/0023538 | A1* | 1/2003 | Das et al. ....................... 705/37 |
| 2003/0088525 | A1* | 5/2003 | Velez et al. ................. 705/400 |

* cited by examiner

*Primary Examiner*—James Kramer
*Assistant Examiner*—Lindsay M. Maguire
(74) *Attorney, Agent, or Firm*—Ganz Law, P.C.

(57) ABSTRACT

A computer implemented bidding method for use in bidding on auction items that allows for a desired optimization of bid amounts. The method includes selecting a set of one or more biddable items offered at auction wherein for a biddable item the auction offers a ranking for one or more received bids according to bid amounts, determining the current bids for a set of the biddable items, determining a bid amount for a selected biddable item based on a given utility function to determine a set of rankings for achieving a desired optimized outcome from the bidding, and submitting a set of bid amounts.

24 Claims, 13 Drawing Sheets

LifeTime Value of Newbie Clickthru Cohort (not counting current visit)
'ALTV20mar01.xls'
gjr - 20mar01

| | | |
|---|---|---|
| Redirect Fraction, $f_R$ = | 0.40 | |
| Ave net margin contribution per visitor, AbarM($) = $ | 0.25 | |
| Fraction of Newbies in current Cohort $f_N$ = | 0.80 | |
| Floor loyalty fraction, $f_L$ = | 0.03 | |
| Size of Clickthru cohort, $N_C$ = | 1,000 | |
| Annual discount rate, $I$ = | 8.00% | |
| Number of Return visits per year = | 12 | 0.0833 = $T_V$(yr), Return visits interval |
| Length of horizon (yrs) = | 2 | 24 = $n$, LTV horizon in number of $T_V$ intervals |

Infinite Horizon

Discounted LTV margin per consumer, $A_{LTV,inf}$ = $ 0.37    $ 373.02 = Discounted LTV from cohort

$nT_V$ Horizon

Non-discounted LTV margin resulting from revisits from cohort, $A_V$ = $ 2.40    $ 57.60 = Non-discounted cohort LTV Discounted LTV margin per consumer, $A_{LTV,n}$ = $ 0.05    $ 53.21 = Discounted LTV from cohort $$A_V = f_R \bar{A}_M f_N f_L N_C$$

$$A_{LTV,\infty} = \sum_{i=1}^{\infty} \frac{(A_V / N_C)}{(1+I)^{iT_V}} = \sum_{i=1}^{\infty} \frac{f_R f_N f_L \bar{A}_M}{(1+I)^{iT_V}} = \frac{f_R f_N f_L \bar{A}_M}{(1+I)^{T_V} - 1}$$

$$A_{LTV,nT_V} = \sum_{i=1}^{n} \frac{(A_V / N_C)}{(1+I)^{iT_V}} = \sum_{i=1}^{n} \frac{f_R f_N f_L \bar{A}_M}{(1+I)^{iT_V}} = \frac{f_R f_N f_L \bar{A}_M (1+I)^{-T_V} \left[1 - (1+I)^{-nT_V}\right]}{1 - (1+I)^{-T_V}}$$

Fig. 10

AUTOMATED BIDDING SYSTEM FOR USE WITH ONLINE AUCTIONS

RELATED APPLICATION

This application claims priority from provisional application Ser. No. 60/307,080 filed on Jul. 20, 2001. The disclosure of said provisional application is hereby incorporated by reference in its entirety for all it teaches.

BACKGROUND OF THE INVENTION

Under one current paradigm, advertisements for products and services may be dynamically inserted into designated spaces on web pages creating advertisements known as "banner ads". A user interested in a product or service featured in a banner ad may click on the ad to reach a website associated with the advertiser. This system does not efficiently link buyers and sellers. For example, a potential buyer may not be interested in an advertised product or service, or the ads do not lead the potential buyer to a range of competitive products and services to evaluate.

A more direct way for potential buyers to find information about a product or service in which they may have current interest is to input words that relate to the product or service into a search engine that searches web sources for information about the product or service. If structured properly, such a search will typically locate information about a range of competitive products. The disadvantage of this system is that along with relevant hits, the search engine will find many hits that are not relevant to the user's interests. Relevant hits may be buried deeply in the list of returned results, and they may be extremely difficult to find among the irrelevant results.

To address this situation, some search portals now provide for selectivity in terms of how results are returned to a user in response to a user's input of search terms (hereinafter search terms in the nature of one or more "keywords"). This creates an opportunity for keywords input into the search engine to determine the ranking of results returned to a user. The assumption is that when such words are entered into a search engine, the user is engaging in a search for related products or services. In a competitive market place, merchants with significant offerings of products and services will want to make such offerings available to potential buyers to communicate price and value opportunities. Accordingly, there is a growing number of search portals that auction search result rankings for predetermined keywords related to a product or service.

An exemplary keyword auction system is seen in Appendix A, which is incorporated by reference. Appendix A is a copy of web pages illustrating and describing features of an online search system of a web search portal operated by Overture (formerly GoTo.com). The first two pages of Appendix A reference a biddable item in the nature of the predetermined keywords "digital camera". When the keyword is entered into the search engine user interface and a search run, a list of results are returned, as shown. The list is a compilation of links to websites related to the keywords, and the links may include descriptive information about the information on the linked websites. The links are presented in the order of the website that has committed to the highest bid for the keyword. For example, www.xistral.com is at the top of the list. Its bid for the keyword is displayed. It is $1.00. At the bottom of the page, in the number five position, is a link ad.farm.mediaplex.com. It has bid $0.42 for its fifth place ranking. Any number of rankings may be produced in the search results. When a web user clicks on a link, the website is required to pay the auction site the indicated bid amount. A website may competitively change its ranking by changing its bid amount relative to the other current bids. In some cases the bidder is an infomediary that provides services to facilitate transactions between consumers and merchants. For example, the infomediary may bid on a keyword to achieve a desired ranking for the keyword. If the web user clicks on the infomediary's ranked listing in the search results, the user will be taken to the infomediary's website where there may be an aggregation of focused information about the product or service of interest. Once at the site, the user can purchase products or services or click-thru to, or be redirected to, online merchants that provide the products and services of interest. The infomediary will typically charge a merchant a fee or commission, or receive some other economic benefit from the merchant, in exchange for the service of placing a potential buyer in contact with the merchant.

With the exception of Google.com, virtually all search engines on the Internet today (circa 2002) seek to maximize their revenues by charging for search results placement. The concept of Pay-Per-Click ("PPC") was pioneered by GoTo.com (now Overture) and, while initially derided, has become the predominant method by which buyers meet sellers on the Internet. In a few short years, GoTo's introduction of the auction principle to online marketing transformed old-fashioned media buys into a real-time market place not unlike a stock exchange.

From the highly dynamic and multi-dimensional nature of such marketplaces arises a critical problem that plagues most of today's eCommerce sites: what is the optimal way to acquire PPC traffic? The present invention solves that problem.

On the surface, the apparently simple question of how much an eCommerce site should bid on a keyword begs an equally simple answer: less than it's worth. In other words, if the profit from an average visitor to a site is a dollar, the bid policy would be to spend as little as necessary—certainly less than a dollar—to get that visitor in the door.

On the surface, this approach—let's call it a bidding strategy—appears plausible. In reality, though, the most profitable expenditure of a given marketing budget is complicated by the following factors:

the number of keywords to bid on may be in the tens of thousands, with each keyword vying for a share of the budget there are numerous search engines available for keyword placement, each with unique financial characteristics the amount of traffic received from a keyword depends on the rank in the search results (which depends on the amount bid . . . )

rank is, of course, also determined by competitors' bids (which may be influenced by our bid . . . )

bids on a keyword are updated at increasing frequency, often several times per hour, if not minute the revenue per click is uncertain and varies from keyword to keyword the value of a new customer exceeds that of the expected profit per visit as a function of, among other factors, the expected lifetime value (LTV) of a new customer temporal, seasonal, geographical and other factors influence the RPC of a keyword.

These insights give rise to increasingly sophisticated bid strategies such as computing the expected revenue for each keyword and bidding some fraction thereof eliminating any gap between one's own bid and that of the next-lowest competitor adjusting bids for relative 'quality of traffic', i.e. aggregate conversion, received from different search engines multiplying the expected profit per click with the expected traffic for each search results position and maximizing that product, etc.

Not only are none of the above strategies or combinations thereof optimal, they are not even 'satisficing'. Only the present invention computes a solution to the bidding conundrum that is the best possible one given available computing resources.

The Internet and the systems operated thereon have proven to be great facilitators of commerce. Yet these systems are still young and inefficient. In particular there is a need for improved systems that enable buyers and sellers to easily and efficiently reach each other regarding products and services offered over the Internet. As the real-life use of the present invention at assignee BizRate.com has demonstrated, its impact on an eBusiness' bottomline may well be significantly improved, enabling the infomediary to provide consumers with superior shopping opportunities.

SUMMARY OF THE INVENTION

Relative to systems such as the foregoing, the present invention provides a "Keyword Automated Bidding System" ("KABS") which, among other things, provides an intelligent system for bidders to determine bids and bidding strategies that maximize return on bid investments and help direct allocation of available funds for bids to keywords that lead to more optimal returns. The present invention is designed to generate a scalable solution to the problem of selecting the proper set of keywords to bid and the proper values of such bids for thousands of keywords on third party sites such as Overture and Google.com. The satisficed solution is generated according to model constraints and utility functions defined by the KABS operator. In the embodiment discussed below, KABS maximizes ROI to the bidder which is the ratio of the aggregate Revenue per Redirect (RPR) from the merchants to the Cost per Click (CPC) paid to the traffic source (the subtraction of the constant 1 is dropped from further consideration). In that embodiment, the prime constraint on the solution is the total CPC dollar amount that is budgeted over a fixed interval of time (day, week, etc.).

KABS may include a computational subsystem that performs the estimation of arrival or click-thru rates for each keyword or category of keywords as a function of their display ranks on the source site. It is the form and level of this estimated function that is critical in the selection of the proper display rank from an active bid table. The active bid table may be created by a spider that retrieves keywords and current bids from an auction site.

The KABS operator will be required to provide the inputs that direct and constrain the system's operation. Among these is the comprehensive set of keywords of interest from which the proper subset (the bid list or bidset) will be computed. Other key inputs include the frequencies of executing the various KABS functions from recomputing the arrival functions to regeneration of the bidset of keywords along with their corresponding bids and display ranks.

Certain, non-exhaustive example embodiments of the present invention follow. In one possible embodiment the present invention contemplates a computer implemented bidding method for use in bidding on auction items that allows for a desired optimization of bid amounts over a selected set of one or more biddable items comprising: selecting a set of one or more biddable items offered at auction, determining the current bids for a set of the biddable items and determining a bid amount for a selected biddable item based on a given utility function, submitting a set of bid amounts to an operator of an auction that associates a ranking for the bid amount received for a biddable item.

In another possible embodiment, the present invention contemplates a computer implemented bidding method for use in an online auction of keywords by the operator of a search engine, comprising: selecting a set of keywords from a given list of keywords being auctioned and generating a bid amount and target rank for each selected keyword so as to maximize a given utility function.

In another possible embodiment, the present invention contemplates a computer system with means for bidding on auction items that allows for a desired optimization of bid amounts over a selected set of one or more biddable items, the system having functions for: determining a bid amount for a selected biddable item from the current bids for a set of the biddable items based on a given utility function.

In another possible embodiment, the present invention contemplates a computer system having means for use in bidding on auction items that allows for a desired optimization of bid amounts over a selected set of one or more biddable items, the system having functions for: selecting a set of one or more biddable items offered at auction; determining the current bids for a set of the biddable items; and determining a bid amount for a selected biddable item based on a given utility function.

In another possible embodiment, the present invention contemplates a method of obtaining a ranked result by a search engine comprising: bidding on a keyword controlled by the operator of a search engine that provides ranked results of links related to the keyword based on bids; the bid being determined by a keyword automated bidding process that optimizes or satisfices a given utility function.

In the foregoing methods and systems, the utility function may be a maximum profit or maximum ROI based on a cost of the successful bid and a resale value associated with the biddable item. In the foregoing methods and systems the biddable item may be a ranked inclusion in a search results list on a webpage available to online users, and the utility function is based on a level of traffic associated with online users selecting the link to the webpage. In the foregoing methods and systems the determination of current bids may include a determination of the nearest bid below the current bid. In the foregoing methods and systems the determination of current bids may include a determination of the nearest bid above the current bid. In the foregoing methods and systems the determination of current bids may include a determination of the nearest bid below and above the current bid. In the foregoing methods and systems the biddable item may be a set of keywords auctioned by the operator of an online search engine and the computer implemented bidding methods and systems optimizes cost per click for existing keywords by decreasing the bid amount to a predetermined amount above the next lower bid. In the foregoing methods and systems the predetermined amount may be a minimum monetary increment above the next lower bid. In the foregoing methods and systems the utility function may be the expected aggregate profit generated. In the foregoing methods and systems, the utility function may be at least one or more of the following: maximizing profit from a given budget, maximizing traffic to the operator's site, maximizing redirects from the operator's site to another site, and maximizing the number of page views on the operator's site. In the foregoing methods and systems the method may be operated under one or more preselected constraints. In the foregoing methods and systems, the budget to be spent may be constrained over a given time interval. In the foregoing methods and systems, the selected keywords in a given keyword list may be mandated to be included in the bid list regardless of profit consequences. In the foregoing methods and systems, a given rank may be mandated for certain keywords. In the foregoing methods and systems, two or more constraints may be combined. In the foregoing methods and systems, a function may be included for submitting a set of bid amounts to an operator of an auction that associates a ranking for the bid amount received for a biddable item.

BRIEF DESCRIPTION OF THE DRAWINGS

FIG. 10 shows the calculations of the discounted and undiscounted life time value of a new customer over various time horizons.

DETAILED DESCRIPTION OF THE INVENTION

Figure 15:
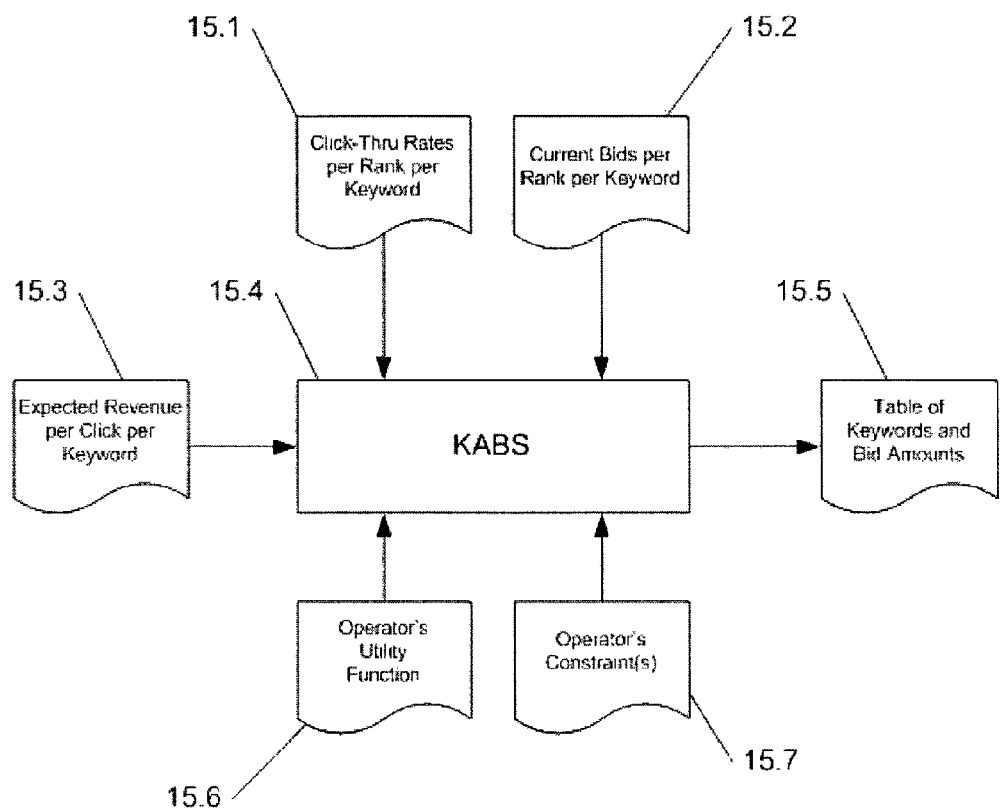
FIG. 15 presents a high-level overview of KABS and its key inputs and output.

This section describes a system according to the present invention, and generally shown in FIG. 15, for selecting a set of keywords to bid and proper bid values. Inputs to the KABS Optimization Module 15.4 include click-thru rates 15.1 and current bids 15.2 and expected revenues 15.3 for each keyword as well as the KABS operator's utility function 15.6 and constraints 15.7. From these, KABS 15.4 produces its output, a table of selected keywords and corresponding bid amounts 15.5. While this invention is described relative to use on keywords in online systems, it is contemplated that the present invention may be generally used relative to other auction systems for bidding on offered items.

Figure 16:
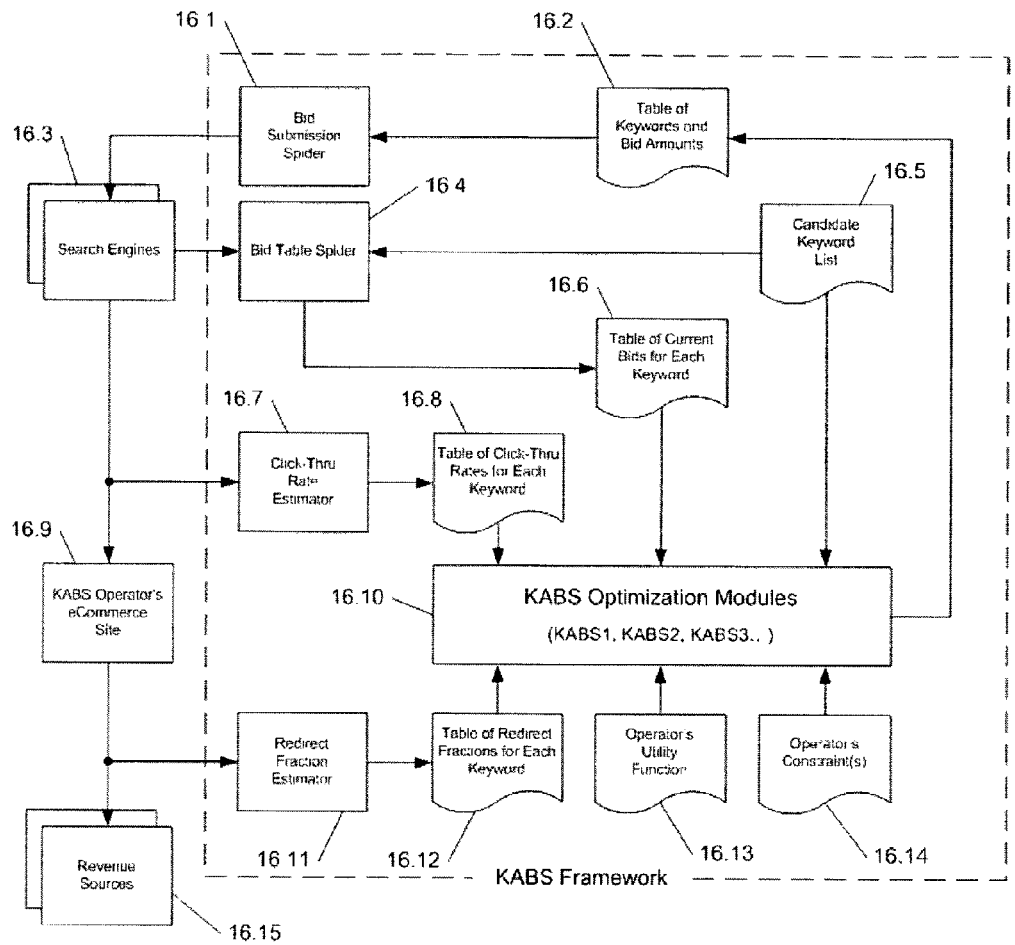
FIG. 16 presents a preferred embodiment of the KABS framework, its main components and its relationship to key web sites.

One preferred embodiment shown in FIG. 16 has various components and features, which are novel standing alone or in combination with each other. In this embodiment, the table of keywords and bid amounts 16.2 is submitted to one or more search engines 16.3 via a bid submission spider 16.1, the design of which is well within the skills of a person in the arts. In another possible embodiment, the table of keywords and bid amounts 16.2 is a file accessed directly by a cooperating search engine 16.3, obviating the need for bid submission spider 16.1.

A bid table spider 16.4 gathers current bid information for each keyword included in candidate keyword list 16.5 from a search engine 16.3 and makes it available to KABS 16.10 in the form of a table of current bids 16.6. The design of bid table spider 16.4 is a routine programming tasks, the details of which are not included here. In another embodiment of the present invention, a cooperative search engine 16.3 might make a table of current bids directly available to KABS 16.10 and eliminate the need for bid table spider 16.4.

In this novel aspect of the present invention, click-thru rate estimator 16.7 computes a table of click-thru rates 16.8 for each keyword from the traffic which KABS operator's eCommerce site 16.9 receives from search engines 16.3.

Redirect fraction estimator 16.11 computes from the traffic sent by KABS operator's eCommerce site 16.9 to one or more of its revenue sources 16.15 a table of redirect fractions 16.12.

A KABS operator defines a utility function 16.13 and one or more constraint(s) 16.14. From these inputs and the previously describes table of click-thru rates 16.8, table of current bids 16.6, candidate keyword list 16.5 and table of redirects 16.12, KABS computes the solution in the form of the table of keywords and bid amounts 16.2.

This solution, while generally accurate and useful, may be limited due to the sale, visibility and dynamics of the keyword bidding environment. One satisficed solution is generated within the model constraints by maximizing ROI to the bidder-reseller, as previously defined. The following sections describe the system modularity, data flow and mathematical model of the KABS framework and three possible embodiments of its optimization modules. Persons skilled in the art will appreciate the following sections are exemplary rather than limiting.

1. KABS Framework $N_{C,k}$=# click-thrus from search site from keyword (KW) $k \in K$ during interval T.

$N_{R,k}$=# redirects from purchasing or bidding site from consumers arrived from KW=k click-thrus.

$A_{CPC,k}$=Average $ cost per click-thrus for KW=k during T.

$A_{RPR,k}$=Average $ revenue per redirect for KW=k during T.

1.1. ACPC and the Bid Table (BT)

For each KW there is available a BT that contains three columns denoting rank, current bid, and bidder. For KABS this table can be collapsed into a n+1 element bid vector $\underline{b}$. The first element denotes bidder's own current rank in $\underline{b}$, the remaining elements denote the current $A_{CPC}$ values in order of ascending rank. Specifically $$\underline{b}=[b_1,b_2,b_3,\ldots,b_{n+1}] \quad (1)$$

The semantic of a submitted bid is

"I bid $A_{CPC}$ (to achieve current rank r)."

The system responds by assigning rank r in the following manner.

1) if $b_1$=0 (bidder had no current bid for this KW), then insert $A_{CPC}$ as the new last element of $\underline{b}$ and resort $b_2$ thru $b_{n+1}$ so that $b_i$=$A_{CPC}$. Set assigned rank to r=i−1

2) if $b_1$=j≠0 (bidder has current bid for this KW), then substitute $A_{CPC} \rightarrow b_j$ and resort $b_2$ through $b_{n+1}$ so that $b_i$=$A_{CPC}$. Set assigned rank to r=i−1.

At any time the set $K' \subseteq$ defines the KW's for which there are active bids and therefore purchased display ranks outstanding. This means that for those bid vectors $$b_{1,k} > 0, k \in K' \quad (2)$$

and $$b_{1,k} \equiv 0, k \in K/K' \quad (3)$$

KABS will continue retrieving BTs and maintain bid vectors from the complementary set K/K' at some reduced sampling frequencies. We label K' the active set.

1.2. Bid Calculation

Figure 2:
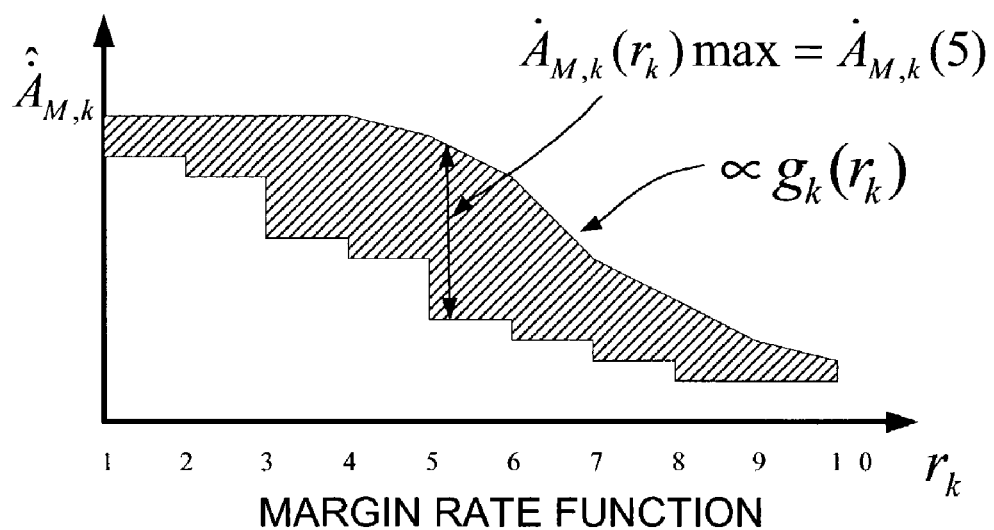
FIG. 2 illustrates the margin rate of a keyword as a function of the first 10 bid positions.

Suppose we decide to buy rank r=i for some KW. If the existing bids are as shown in FIG. 2, then our bid $A_i'$ must be $$A_i' \in (A_i, A_{i-1})$$

Specifically $$A_i' \gtrsim A_i + \delta A$$

where $\delta A$ is the minimum allowable increment, say, $0.01.

It is clear that we want to pay as little as possible for r=i. Therefore $A_i' = A_i + \delta A$ is a reasonable bid. We may, however, want to make our bid a little higher, say, $A_i + n\delta A$ where $n \geq 2$. Such policy 1) gives some 'light' to a successive bidder who wants r=i+1. Then if they see two adjacent bids differing by $\delta A$, then it costs only $\delta A$ more to obtain r=i-1, else they must settle for r=i+2.
2) makes it more expensive for the former r=i holder to reestablish that rank.

1.3. Estimating KABS Click-Thru Rate Function

KABS performance is heavily dependent on the availability of an accurate click-thru rate function g(r). g is in units of, say, 1/day if the budget horizon T is in terms of multiple (integer) days. g is a monotonically decreasing function of display rank r where $g(r) \geq g(r')$ for all r & r' such that r<r'. g is 'normed' in the sense that $g(1)=1$ where $r=1, 2, 3, \ldots$. Therefore scaling g properly by multiplying a known number of click-thrus at a known r lets us specify the scaled click-thru function $\dot{N}_c(r)$. Specifically, suppose $N_c(r')$ is available for an arbitrary $r=r'$ over some interval T'. Then by definition $$N_c(r') = \dot{N}_c(r')T' \quad (4)$$

giving $$\dot{N}_c(r') = N_c(r')/T' = N_1 g(r') \quad (5)$$

which lets us obtain all other values of $N_c(r)$ from the scaled $$\dot{N}_c(r) = \left[\frac{N_c(r')}{g(r')T'}\right] g(r) = N_1 g(r) \quad (6)$$

when a proper g(r) is available.

The problem here is how to compute g(r) from actual click-thru counts that arrive over arbitrary intervals for various KW's from a source site.

Without loss of generality we assume that a g(r) is valid for all $k \in K$ where K is some suitably chosen set/category of KW's. Then inputs to the estimation process are a sequence of tuples for constant $r_k$ $$\{N_k, r_k, t_{Fk}, t_{Lk}\}_i, i=1, 2,$$

where the $t_{Fk}$ and $t_{Lk}$ mark the FIRST and LAST times of when the $N_k$ chick thrus were resorted. (In the sequel we drop the subscript C from $N_c$.)

Let $$T_{k,i}' = (t_{Lk,i}' - t_{Fk,i})/24 \quad (7)$$

then the direct calculation of the scaling constant is $$N_{1k,i} = \frac{N_{k,i}}{g(r_{k,i})T_{k,i}'} \quad (8)$$

Note that the scaling constant calculation presumes the availability of the rate function we are trying to estimate. In effect, the observation i states that it was the output of the underlying 'g(r) process' such that $$\dot{N}_{k,i} = N_{1k,i} g(r_{k,i}) = \frac{N_{k,i}}{T_{k,i}'} \quad (9)$$

or, in terms of the observations $$g(r_{k,i}) = \frac{\dot{N}_{k,i}}{N_{1k,i}} = \frac{N_{k,i}}{N_{1k,i} T_{k,i}'} \quad (10)$$

where $T'_{k,i}$ is the fraction of a day.

Figure 5:
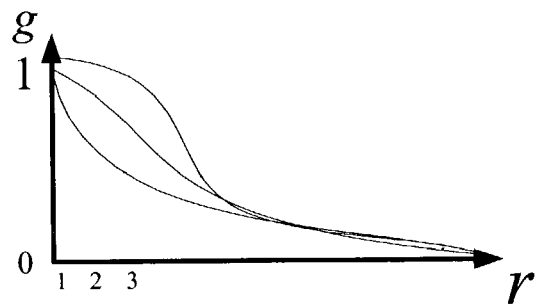
FIG. 5 displays various plots of possible relationships between rank and click-thrus.

A sequential estimation scheme can be developed from (9) & (10). From actual data it is clear that g can be expressed in terms of a parameter vector $\underline{c}$, $$g(\underline{c}, r) = c_0 - \frac{c_0 - c_1}{1 + e^{-c_2(r - c_3)}} \quad (11)$$

where $\underline{c} = [c_0, c_1, c_2, c_3]^T$ with semantics
$c_0 = g(\underline{c}, 1) = 1$
$c_1 = g(\underline{c}, \infty) < c_0 \gtrsim 0$
$c_2 =$ speed of decline>0 (near breakpoint $r = c_r$)
$c_3 =$ location of breakpoint display rank $\geq 0$
Plotting this can take various shapes as shown in FIG. 5.

From these arguments we rewrite the normalized g as $$g(\underline{c}, r) = \left[1 - \frac{1 - c_1}{1 + \exp(-c_2(r - c_3))}\right] \Big/ \left[1 - \frac{1 - e_1}{1 + \exp(-c_2(1 - c_3))}\right] \quad (12)$$

where the redefined c is $$\underline{c} = [c_1, c_2, c_3]^T \quad (13)$$

Figure 6:
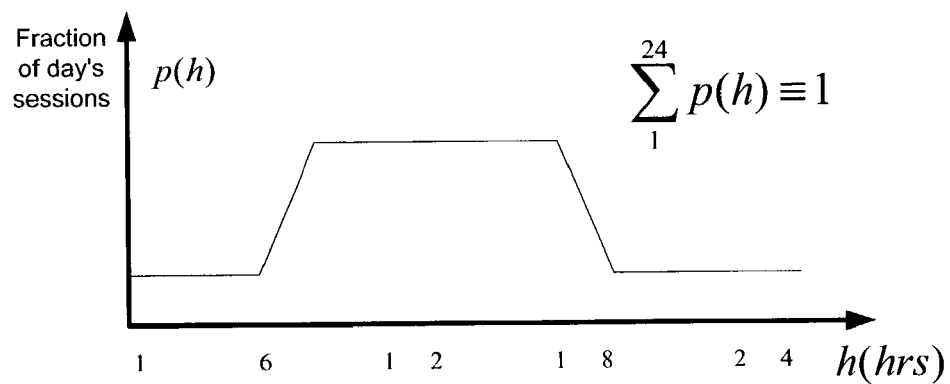
FIG. 6 shows an approximate session start rate over a 24 hour period.

With (12)&(13) it is clear that current estimates of $\underline{c}$ and $N_{1,k}$ permit us to predict the click-thru rate for any KW=k over a T' during which the session (start) rate is constant. However, in general this is not the case over a period of several hours. The approximate session start rate over a 24 hour period is shown in FIG. 6.

We continue on the basis of estimating all $N_k$ in units of click-thrus/day. Therefore the scaling constant $N_{lk}$ must account for when during the day its observation interval $T'_k$ occurred. If $T'_k$ occurred during hour h, then the daily equivalent of the observed click-thrus $N_k(T'_k(h))$ is calculated from $$N_k = \frac{N_k(T'_k(h))}{p(h)} \quad (14)$$

Figure 7:
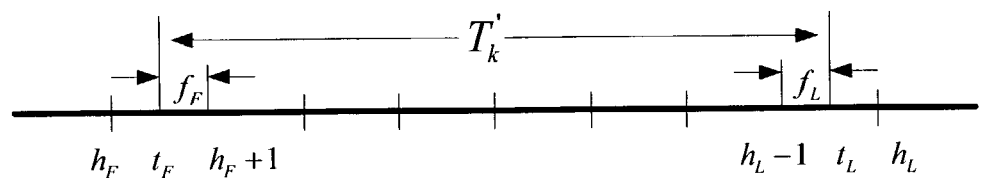
FIG. 7 illustrates a sample time period spanning fractional hours.

If $T'_k$ spanned several hours, then $N_k$ is computed from $$N_k = \frac{N_k(T'_k)}{\int_{t_F}^{t_L} p(h)\,dh} \simeq \frac{N_k(T'_k)}{\sum_{h \in T'_k} p(h)} \quad (15)$$

where $T'_k = t_L - t_F$ as before. In general p(h) is available as a discrete valued function for the 24 hours of a day, hence the summation form of (15) will be used. It is important to include the boundary condition in computing this sum since $t_F$ & $t_L$ may not fall exactly on the hour that defines p(h). FIG. 7 makes this clear, where the fs are the indicated fractions of the first and last hours in $T'_k$. The summation in (15) then becomes $$\sum_{h \in T'_k} p(h) = \sum_{h=h_F+1}^{h_L-1} p(h) + f_F\left[\frac{p(h_F) + p(h_F+1)}{2}\right] + f_L\left[\frac{p(h_L-1) + p(h_L)}{2}\right] \quad (16)$$

It is this adjusted value of $N_k$ from (15) that is now used in (8), (9), and (10), and this form is assumed in the sequel. This makes the observed tuple defined above a pseudo-observable since we substitute the adjusted $N_k$ from (15) for the actual observed number of click-thrus. This substitution changes a 'clean' (noise-free) observation into a noisy one due to the errors in p(h). (We may later allow additional errors from relaxing the constraint on the 'known' value of r.)

The estimator design is based on the formulation in (10) rewritten as $$N_{1k,i} g(\underline{c}_i, r_{k,i}) = \frac{N_{k,i}}{T'_{k,i}} \quad (17)$$

$N_{k,i}$ is made noisy by the adjustment in (15); $T'_{k,i}$ is known exactly. We need to compute the estimated values $\hat{N}_{1k}$ and $\hat{g}$ where $$\hat{g}(r) = g(\underline{\hat{c}}, r) \quad (18)$$

with its functional form prescribed in (12). g will be used for all $k \in K$, but the value of $N_{1k}$ needs to be specified for each KW.

1.3.1. Observation Vector

The pseudo-observation form KW-k at rank $r_k$ at $t_i$ is $$y_{k,i} = N_{k,i}(r_{k,i})/T'_{k,i} \quad (19)$$

where $N_{k,i}$ is the adjusted count from (15). This given the observation variance $$W_i = \left[\frac{\sigma_N(T'_{k,i})}{T'_{k,i}}\right]^2 \quad (20)$$

$\sigma_{N1}(T'_{k,i})$ represents the error in $N_{k,i}$ and from the above discussion is only a function of $T'_{k,i}$ since that term specifies which and how the noisy session rate fractions p(L) are incorporated.

$W_i$ will be derived below. Note that the 'observation' of $r_{k,i}$ is now explicit and assumed error free.

1.3.2. State Vector

The state vector to be estimated is defined as $$x_{k,i} = \begin{bmatrix} N_{1k,i} \\ \underline{c}_i \end{bmatrix} \quad (21)$$

giving the estimate at $t_i = t_{L,i}$ as $$\hat{x}_{k,i} = \begin{bmatrix} \hat{N}_{1k,i} \\ \underline{\hat{c}}_i \end{bmatrix} \quad (22)$$

with covariance $$R_i = E[(\underline{x} - \underline{\hat{x}})(\underline{x} - \underline{\hat{x}})^T]_{k,i} \quad (23)$$

1.3.3. Innovation

The innovation at $t_i$ (actual minus predicted observation) is $$\delta \underline{y}_{k,i} = \tilde{y}_{k,i/i-1} - y_{k,i} \quad (24)$$

where the i/j subscript denotes the estimation validity instant $t_i$ calculated with inputs up to and including $t_j$.

1.3.4. State Transition

There is no basis for an intrinsic change in g or the individual $N_{1k}$ between observations. The only exception may be in the $N_{1k}$ which may grow over time and may show some bursts of growth and sudden declines due to the popularity of some KW's and/or during preparation for certain holidays. If overall session traffic grows at some rate $\dot{S}$, then we may scale up the predicted $N_{1k}$ accordingly.

Specifically, let $$\dot{s}(i, j) = \frac{s_i - s_j}{s_j} \quad (25)$$

where the s denote the number of sessions per day during the respective days i,j. $\dot{s}(i,j)$ then represents the fractional (%) growth per day over the $[t_j, t_i]$ interval. We assume that this rate is computed periodically as a 'side process' and changes little in the intervals. Dropping $\dot{s}$ subscripts lets us write $$N_{1k,i/i} = \hat{N}_{1k,j-1/i-1}[1 + \dot{s}(t_j - t_{j-1})] \quad (26)$$

Noting that the $\underline{c}$ should remain unchanged during this interval lets us write the 'partial state transition' matrix for all k as $$U_{i,i-1} = \begin{bmatrix} 1+\dot{s}(t_i - t_{i-1}) & 0 & 0 & 0 \\ 0 & 1 & 0 & 0 \\ 0 & 0 & 1 & 0 \\ 0 & 0 & 0 & 1 \end{bmatrix} \quad (27)$$

This lets us predict what the current ($t_i$) state in terms of its last estimate ($t_{i-1}$) as $$\hat{\underline{x}}_{k,i/i-1} = U_{i,i-1}\hat{\underline{x}}_{k,i-1/i-1} \quad (28)$$

1.3.5. Predicted Observation

The observation for $r_{k,i}$ we expect to make in the absence of noise is $$\tilde{y}_{k,i/i-1} = \frac{\hat{N}_{1k,i/i-1}[1+\dot{s}(t_i - t_{i-1})]g(\hat{\underline{c}}_{i/i-1}, r_{k,i})}{T'_{k,i}} \quad (29)$$

where from (27) we note that $\hat{\underline{c}}_{j/i-1} = \hat{\underline{c}}_{j-1/i-1}$.

1.3.6. The Estimation Process

The estimator will take the form of an extended Kalman filter. This choice is based on the complexity of the estimation process as described above. We have a segmented state vector a portion of which is specific to each KW and the remainder being general across all K. The observations arrive asynchronously in arbitrary order and with variable reliability.

The error in the estimated state is given by $$P_{i/i} = \cos(\hat{\underline{x}}_{i/i}) \quad (30)$$

the covariance matrix. This covariance is initialized by a diagonal matrix $$P_{k,0/0} = \begin{bmatrix} \sigma^2_{c_{00}} & 0 & 0 & 0 \\ 0 & \sigma^2_{c_{1,0}} & 0 & 0 \\ 0 & 0 & \sigma^2_{c_{2\,0}} & 0 \\ 0 & 0 & 0 & \sigma^2_{c_{30}} \end{bmatrix} \quad (31)$$

and projected forward between observations by its prediction equation $$P_{k,i/i-1} = U_{i,i-1} P_{k,i-1/i-1} U^T_{i,i-1} + R_i \quad (32)$$

$R_i$ is taken to be a diagonal matrix where values determine the length of the fading memories related to the estimated components of the state vector. In general $R_{k,i}$ is the constant matrix for KW=k $$R_{k,i} = \begin{bmatrix} \sigma^2_{N_{1,k}} & 0 & 0 & 0 \\ 0 & \sigma^2_{c_1} & 0 & 0 \\ 0 & 0 & \sigma^2_{c_2} & 0 \\ 0 & 0 & 0 & \sigma^2_{c_3} \end{bmatrix} \quad (33)$$

Increasing any element in $R_{k,i}$ makes the estimate of the corresponding state component more responsive to the current observation. Decreasing it has the opposite effect. Therefore $R_{k,i}$ is an adjustable 'knob' of the filter and can be used to account for holidays and KW popularity swings.

1.3.7. Measurement Matrix

The measurement matrix L relates the state vector $\underline{x}_{k,i}$ to the observation $y_{k,i}$. Since by (29) the observation is a nonlinear function of state, we must use the linearized approximation $$L_{k,i} = \left[\frac{\partial y_k}{\partial \underline{x}_k}\right]_i \quad (34)$$

which here yields the vector with components $$L_{k,i} = \left[\frac{\partial y_k}{\partial N_{1k}}, \frac{\partial y_k}{\partial c_1}, \frac{\partial y_k}{\partial c_2}, \frac{\partial y_k}{\partial c_3}\right]_i \quad (35)$$

The partial derivatives from (29) evaluated at $t_i$ are $$\left.\frac{\partial y_k}{\partial N_{1k}}\right|_i = \frac{[1+\dot{s}(t_i - t_{i-1})_k]g(\hat{\underline{c}}_{i/i-1}, r_{k,i})}{T'_{k,i}} \quad (36)$$

It is important to note that the interval $(t_i - t_{i-1})_k$ reflects the time since $y_{k,i-1}$ was observed for KW−k. The predicted value of $\underline{c}$, however, is the last estimate $\hat{\underline{c}}$ whenever it was calculated since that part of the state transition matrix (27) in the identity matrix. This lets us observe the counts for many KW's at a single observation time $t_i$ and sequentially run the estimator for each KW observed and update each $\hat{N}_{1k}$ independently while using all observations to contribute to the updating of $\hat{\underline{c}}$.

The remaining $L_{k,i}$ components evaluated at $t_i$ are $$\frac{\partial y_k}{\partial c_1} = \hat{N}'_{k,i}\left[\frac{(1+e^{-c_2(1-c_3)})e^{-c_2(1-c_3)} - e^{-c_2(r-c_3)}}{(1+e^{-c_2(r-c_3)})(c_1+e^{-c_2(1-c_3)})^2}\right] \quad (37)$$

$$\frac{\partial y_n}{\partial c_2} = \hat{N}'_{k,i}\left[\frac{-(1-c_1)(r-c_3)e^{-c_2(r-c_3)}}{(1+e^{-c_2(i-c_3)})^2\left(1-\frac{1-c_1}{1+e^{-c_2(1-c_3)}}\right)} + \frac{\left(1-\frac{1-c_1}{1+e^{-c_2(1-c_3)}}\right)^2(1-c_1)(1-c_3)e^{-c_2(1-c_3)}}{\left(1-\frac{1-c_1}{1+e^{-c_2(1-c_3)}}\right)^2(1+e^{-c_2(1-c_3)})^2}\right]_c \quad (38)$$

$$\frac{\partial y_k}{\partial c_3} = \frac{-[e^{-c_2(r-c_3)} - e^{-c_2(1-c_3)}][e^{-c_2(r-c_3)}e^{-c_2(1-c_3)} - c_1]c_2(1-c_1)\dot{N}'_{k,i}}{[e^{-c_2(1-c_3)} + c_1]^2[1 + e^{-c_2(r-c_3)}]^2} \quad (39)$$

where from (29) the factor $$\dot{N}'_{k,i} = \frac{\hat{N}_{ik,i-1/i-1}[1 + \dot{s}(t_i - t_{i-1})_k]}{T'_{k,i}} \quad (40)$$

1.3.8. Kalman Gain

The gain matrix is now computed each observation $y_{k,i}$ (i.e. on a per KW basis) as $$K_{k,i} = P_{k,i/i-1}L_{k,i}^T(L_{k,i}P_{k,i/i-1}L_{k,i}^T + W_i)^{-1} \quad (41)$$

We note that the bracketed term is a scalar which makes the indicated inversion a simple division. Note that $K_{k,i}$ is a 4×1 vector.

1.3.9. Updated State & Covariance

The output of the filter consists of the updated state vector $$\hat{x}_{k,i/i} = \hat{x}_{k,i/i-1} + K_{k,i}[y_{k,i} - \tilde{y}_{k,i/i-1}] \quad (42)$$

The covariance matrix of this estimate is $$P_{k,i/i} = [I - K_{k,i}L_{k,i}]P_{k,i/i-1} \quad (43)$$

where I is the 4×4 identity matrix

1.3.10. Observation Variance

The design of the filter is completed with the derivation of the expression for observation noise $W_i$ in (20) above repeated here $$W_i = \left[\frac{\sigma_N(T'_i)}{T'_i}\right]^2 = \sigma^2(y_i)$$

where the k subscript is understood and may refer to a number of KW' whose click-thru counts are recorded after the same interval $T'_i$ From (15) we have the adjusted daily count for KW=k $$N_k = \frac{N_k(T'_k)}{\sum_{h \in T'_k} p(h)}$$

when $N_k(T'_k)$ was the actual count recorded during $T'_k$. The error in $N_k$ derives from the error in the denominator which is a function of the errors in the individual p(h). Overall we know that $$\sigma^2(y) = \sigma^2\left(\frac{N}{T'}\right) = \frac{\sigma^2(N)}{T'^2} \quad (44)$$

But from above $$\sigma^2(N) = \left(\frac{\partial N}{\partial \Sigma}\right)^2 \sigma^2(\Sigma) = \left[-\frac{N}{\left(\sum_{T'} p(h)^2\right)}\right]^2 \sigma^2\left(\sum_{T'} P(h)\right) \quad (45)$$

which requires us to express the error in the sum as the recipient of propagated errors from the individual session fractions p(h), (cf. 16). This lets us write $$\sigma^2\left[\sum_{T'} p(h)\right] = \sum_{T'} \left[\frac{\partial \sum p(h)}{\partial h}\right]^2 \sigma^2[p(h)] \quad (46)$$

Expanding this from (16) gives for T' greater than 1/24 (i.e. greater than one hour)

$$\sigma^2\left[\sum_{T'} p(h)\right] = \sum_{h=h_F+1}^{h_L-1} \sigma^2[p(h)] + \quad (47)$$

$$\left[\frac{f_F}{2}\right]^2 [\sigma^2[p(h_F)] + \sigma^2[p(h_{F+1})]] +$$

$$\left[\frac{f_L}{2}\right]^2 [\sigma^2[p(h_L - 1)] + \sigma^2[p(h_L)]]$$

where the sum is taken over the 'internal hours' as shown in FIG. 7. Combining (45-47) in (44) gives the desired result $$W = \left[\frac{N}{T'\left(\sum_{T'} p(h)\right)^2}\right]^2 \left\{\sum_{h=h_1+1}^{h_L-1} \sigma^2[p(h)] + \left[\frac{f_F}{2}\right]^2 \quad (48)\right.$$

$$[\sigma^2[p(h_F)] + \sigma^2[p(h_F + 1)]]\left[\frac{f_L}{2}\right]^2$$

$$\left.[\sigma^2[p(h_L - 1)] + \sigma^2[p(h_L)]]\right\}$$

Care must be taken to properly express the $f_F$ and $f_L$ representing fractions of the first and last hours covered by T' whose unit is the day (24 hours).

Figure 8:
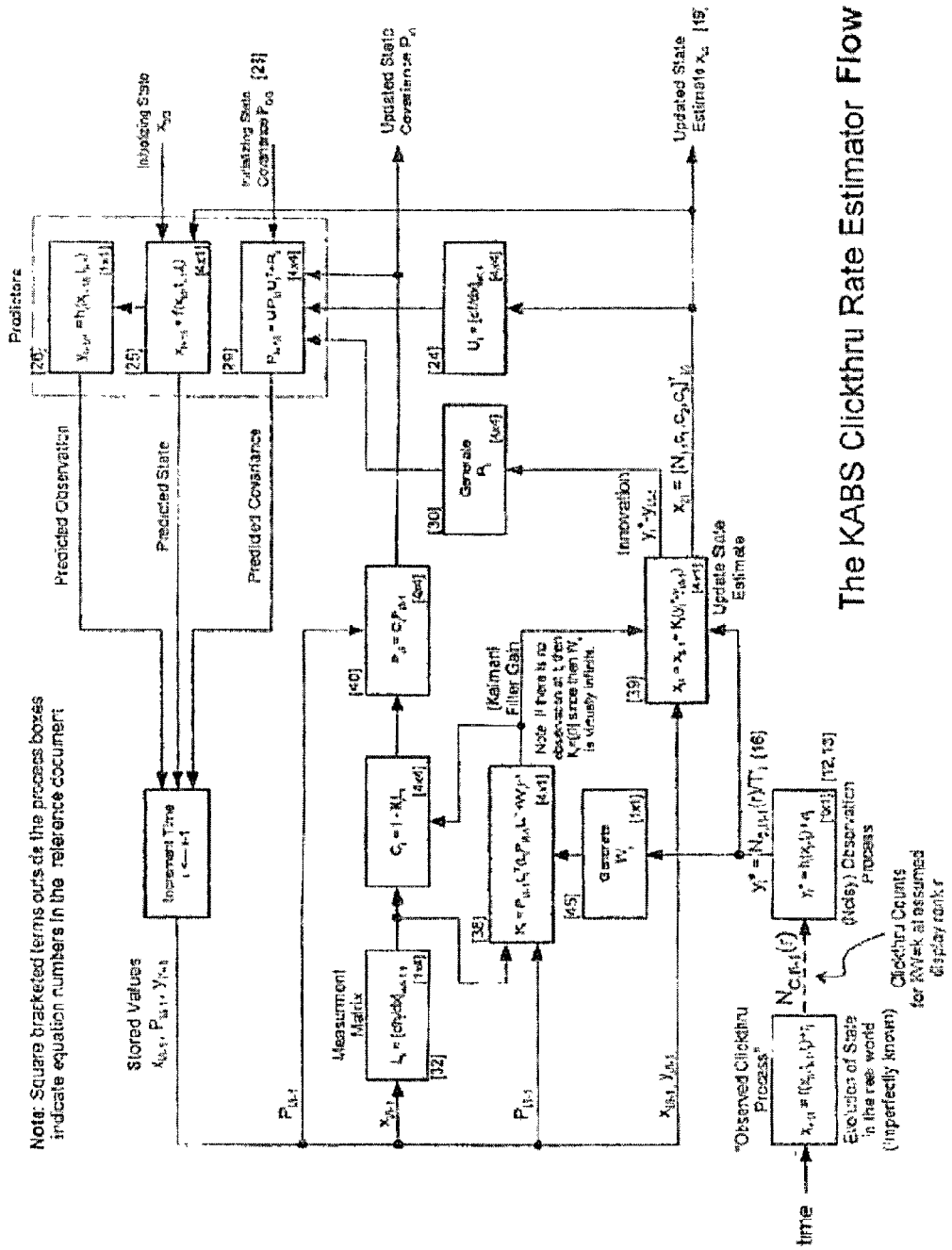
FIG. 8 summarizes the KABS click-thru rate estimator flow as a flow chart.

The control flow of the filter showing the sequence of calculations is given in FIG. 8.

The filter's initial conditions will be determined from testing the actual program with real input data.

FIG. 8 is a flow chart summarizing the foregoing description.

2. KABS Optimization Modules

2.1. KABS 1

Figure 1:
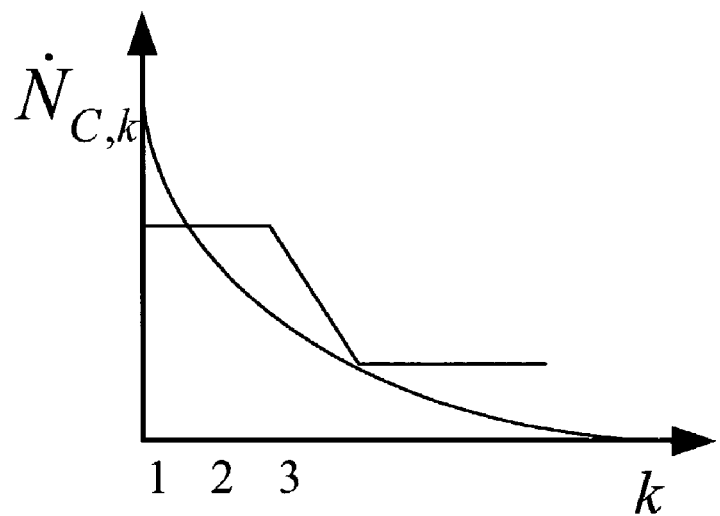
FIG. 1 is a graph of the relationship between display rank and number of click-thrus for a keyword.

As seen in FIG. 1, $\dot{N}_{C,k}$ is a function of display rank r on the content site, $$\hat{N}_{C,k} = g_k(r) \quad (49)$$

$g_k$ may vary as a function of time.

$\dot{N}_{R,k}$ is observed number of redirects and may be related to $\dot{N}_{C,k}$ by $$\hat{N}_{R,k} = f_k \hat{N}_{C,k}, f_k = \text{constant, probably in } [0,1]. \quad (50)$$

where the hats indicate smoothed estimates.

$A_{M,k}$=margin amount from KW=k activity over T, or $$A_{M,k} = N_{R,k} A_{RPR,k} - N_{C,k} A_{CPC,k} \quad (51)$$

then the 'instantaneous' margin note estimate is $$\hat{\dot{A}}_{M,k} = \hat{\dot{N}}_{R,k} A_{RPR,k} - \hat{\dot{N}}_{C,k} A_{CPC,k} \quad (52)$$
$$= A_{RPR,k} f_k \hat{\dot{N}}_{C,k} - A_{CPC,k} \hat{\dot{N}}_{C,k}$$
$$= (f_k A_{RPR,k} - A_{CPC,k}) \hat{\dot{N}}_{C,k}$$

$$\hat{\dot{A}}_{M,k}(r_k) = [f_k A_{RPR,k} - A_{CPC,k}(r_k)] g_k(r_k) \quad (53)$$

where now (53) should in some sense be maximized at all times in a greedy optimization process. The optimization is constrained by 1) $A_T$=total \$ amount allocated $\forall k \in K$ during T
2) $A_{CPC,k}(r_j) > A_{CPC,k}(r_i) \; \forall r_j \ni r_j < r_i$ Overall cost rates is estimated as $$\hat{\dot{A}}_{CPC} = i \sum_K A_{CPC,k}(r_k) \hat{\dot{N}}_{C,k} = \sum_K A_{CPC,k}(r_k) g_k(r_k) \quad (54)$$

which should be minimized during T. Suppose at time t in the interval T that the average CPC rate is $\overline{A}_{CPC}(t)$. Then extrapolating this over the entire remaining interval yields $$\hat{A}_T(t) = T \overline{A}_{CPC}(t) \quad (55)$$

as the estimated (mediated) total expenditure over T. If we seek $\hat{A}_T(t) = A_T$ then at t we want to manipulate K and the bidding process such that $$T \overline{A}_{CPC}(t) = A_T$$

$$\frac{A_T}{T} = \overline{A}_{CPC}(t) \quad (56)$$

Making (56) the operating set point for all $t \in [0,T]$ gives $$\hat{\dot{A}}_{CPC} = \frac{A_T}{T}$$

or from (6)

$$\frac{A_T}{T} = \sum_K A_{CPC,k}(r_k) g_k(r_k) \quad (57)$$

Since there exists no coherent or predictive view of the long-term future (say, over T), it is reasonable to expect that a reliable way to maximize total margin over T $$A_M = \sum_K A_{M,k} \quad (58)$$

is to continuously, in a greedy fashion, maximize the total estimated rate of margin.

$$\hat{\dot{A}}_M = \sum_K \hat{\dot{A}}_{M,k}(r_k) = \sum_K [f_k A_{RPR,k} - A_{CPC,k}(r_k)] g_k(r_k) \quad (59)$$

Subject to the constraint on cost rate given in (57) the equality in (57) is seen to hold since all $g_k$ are monotonically decreasing—i.e. the higher display rank is at most as likely to be clicked as that of the next lowest rank.

We assume that the $f_k$ and $A_{RPR,k}$ are fixed and known $\forall_k$ during any given optimization run. Let the effective revenue received for redirect be $$\alpha_k = f_k A_{RPR,k} \quad (60)$$

Then (59) can be expanded and rewritten using (57) as $$\hat{\dot{A}}_M = \sum_K \alpha_k g_k(r_k) - \frac{A_T}{T} \quad (61)$$

Then, in general, the KABS solution can be written as two |K| length vectors specifying display ranks and costs.

$$\underline{r} = [r_1, r_2, \ldots, r_{|K|}]$$

$$\underline{c} = [A_{CPC,1}, A_{CPC,2}, \ldots, A_{CPC,|K|}] \quad (62)$$

Any values for $\underline{r}$ and $\underline{c}$ could remain optimum only for a relatively short interval in a dynamic bidding environment. For any realistic interval it is unreasonable to expect to achieve a rigorous optimum solution due to the time-late observations of the individual KW bid tables and the delays in computing and transmitting the bids. At best we may strive for a satisficing solution.

In the sequel we assume that T (and $A_T$) are selected so that the situation remaining sufficiently stable for a solution over K to be considered. The problem then is to solve for the satisfying values $\underline{r}^*$ and $\underline{c}^*$ such that concurrently $$\underline{r}^* = \operatorname*{argmax}_{\underline{r}} \hat{\dot{A}}_M = \operatorname*{argmax}_{\underline{r}} \sum_K A_k g_k(r_k) \quad (63)$$

$$\delta \hat{c}^* = \operatorname*{argmin}_{\underline{c}} \left\{ \sum_K A_{CPC,\lambda}(r_k^*) g_\lambda(r_k^*) - \frac{A_T}{T} \right\}^2$$

where the $r_k^*$ are components of $\underline{r}^*$ and $\delta \hat{c}^*$ is the minimum error in the cost rate function from (57)

$$\delta \dot{c} = \sum_K A_{CPC,k}(r_k) g_k(r_k) - \frac{A_T}{T} \quad (64)$$

which ideally equals zero.

2.1.1. Satisficing Model (Solution to Equation (63))

At any time that a recalculation of $\underline{r}^*$ and $\delta c^*$ is derived we examine the margin rate $\dot{A}_{M,k}$ for each KW. This varies as a function of $r_k$ and can be computed from each KW's current $\underline{b}_k$ and $g_k$ as given in (53), which provides:

$$\dot{A}_{M,k}(r_k) = [f_k A_{RPR,k} - A'_{CPC,k}] g_k(r_k) \quad (68)$$

$A'_{CPC,k}$ is the contemplated new bid (which may also be the current bid) for each $k \in K$. It is clear that $\dot{A}_{M,k}$ represents the difference between two discrete valued 'curves' as shown in FIG. 2.

The top curve is simply $f_k A_{RPR,k} g_k(r)$, i.e. proportional to the click-thru rate function. The bottom curve is derived from the current bid vector $b_k$ by leaving out the bidder's bid, if there is one. (This would move up the r of all lower competition bids). The shaded area indicates the (approximate) range of margin rates which is given by $$\dot{A}_{M,k}(r_k) = [f_k A_{RPR,k} - b_{r_k+1}] g_k(r_k) \quad (69)$$

$\dot{A}_{M,k}(r_k)$ is calculated for a range of $r_k$ say, [1,10]. The resulting function will usually have one mode giving the maximum margin rates $\dot{A}_{M,k}(r_k^*)_{max}$ and the optimum display rank $r_k^*$. In FIG. 2 we see that $$\dot{A}_{M,k}(r_k^*)_{max} = \dot{A}_{M,k} \quad (5)$$

giving $r_k^* = 5$.

This process is completed for all $k \in K$ yielding the sets $$\dot{A} = \{\dot{A}_{M,k}(r_k^*)_{max} \forall k \in K\} \quad (70)$$

and $$R = \{r_k^* \forall k \in K\} \quad (71)$$

$\dot{A}$ is then sorted in descending order to yield an ordered set. The new index set of $\dot{A}$ is $\Pi$ and provides the max $k \Leftrightarrow i \in \Pi$. This max is also used to resort R. In the sequel all references to $\dot{A}$ and R will denote these $\Pi$-indexed sets.

It is now clear that (63) is solved through minimizing $\delta \dot{c}$ by generating an ordered sum of decreasing elements from $\dot{A}$ until $$\frac{A_T}{T}$$

is exceeded. If the excess is tolerable then the process is terminated and the optimum KW set $K'^*$ is in hand along with $\underline{r}^*$ and $\underline{c}^*$. The latter, of course, defines the current set of optimum bid amounts. In actuality, $$\underline{c}^* = \underline{c}'^* + n\delta A \quad (72)$$

where $n\delta A$ is the increment added to each amount in $\underline{c}'^*$ as described above.

If the excess is not tolerable, then the last element from $\dot{A}$ is replaced by the next one and the residual again examined. Since these residuals will be a monotonically decreasing sequence, the set $K'^*$ will be obtained in short order. An alternative satisficing model, which is a preferred embodiment is an Adaptive Sort-Pop-Purge algorithm as described below.

2.1.2. ASPP—Adaptive Sort-Pop-Purge Algorithm

This subsection describes the ASPP algorithm for obtaining a satisficing solution to a class of knapsack problems of the form $$\max_{K' \subseteq K} \left\{ p(K') = \frac{\sum_{K'} R_k(\underline{x}_k)}{\sum_{K'} C_k(\underline{x}_k)} \right\} \quad (73)$$

subject to $$\sum_{K'} C_k \leq C_T.$$

The $R_k$ represent a measure of value such as revenues obtained from selecting item k in attribute configuration $\underline{x}_k \in X_k$ the total set of attribute combinations available. At most one of each type k of items may be selected to make up the final knapsack content $K' \subseteq K$, the complete set item types.

The $C_k$ represent measure of knapsack volume taken up by including k in its $\underline{x}_k$ configuration. $C_k$ can also be taken as a direct cost. In this sense ASPP is seen to maximize return on investment (ROI) since from (73)

$$p = ROI + 1 \quad (74)$$

The basic algorithm works by selecting a sort function $S(R,C)$ which is evaluated for all $(x_k,k)$ tuples. The resulting stack is sorted in descending order. The top/first member is selected (the stack is popped) and its 'volume'/cost added to the current cost of K'. If the total cost is less than or equal to $C_T$ then the item is added to K' and the stack is purged of all remaining items of the same type. If $C_T$ is exceeded, then that particular configuration of the item is discarded. In either case the new top item from the stack is popped and the above process is repeated. In that manner the entire stack is processed in a single pass.

If the average arity of $\underline{x}_k$ is a and each component can accept an average of m values, then the size of the stack is $N = |K|am$. It is then seen that the complexity of single pass algorithm is $O(|x| \log N + N) \rightarrow O(N \log N)$.

A promising sort function for ASPP is $$S(k, \underline{x}_k) = p_k(\underline{x}_k) R_k(\underline{x}_k)^a \quad (75)$$

where $$p_k(\underline{x}_k) = \frac{R_k(\underline{x}_k)}{C_k(\underline{x}_k)} \quad (76)$$

is equivalent to a single item/configuration ROI. This is seen as a 'value-weighted ROI' and favors the more valuable version of k when both versions have very similar ROI. This preference is critical since once a type k is selected, the remaining type k items are purged and can never be considered again. For certain monetary problems described above, a of about 0.125 has produced good results. The above sort function may be more concisely written as $$S(k, x_k) = \frac{R_k(x_k)^{1+a}}{C_k(x_k)} \tag{77}$$

The adaptive nature of ASPP derives from the ability to select the best value of a for any given K. This is possible due to the low complexity of the above described single pass process for a single value of a. The overall solution is then expressed as $$(K', X_{K'})^* = \arg\max_a \max_{K' \subseteq K} p(K', X_{K'}) \tag{78}$$

where a can be obtained through a well-known scalar search method such as Fibonacci or golden section search.

2.1.2.1. ASPP Flow

Figure 3:
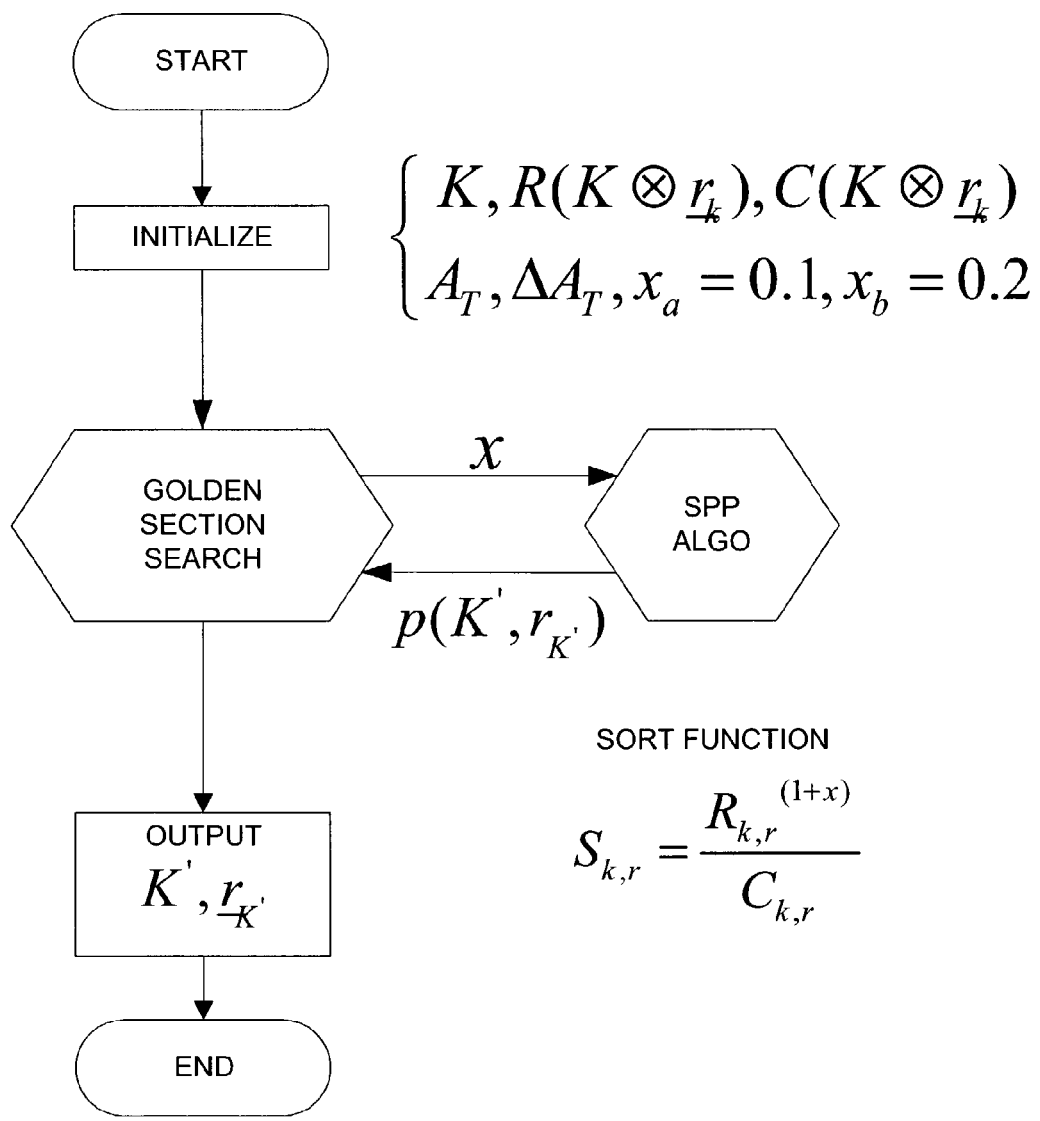
FIG. 3 outlines the outer loop of the computational flow of the knapsack satisficing model.
Figure 4:
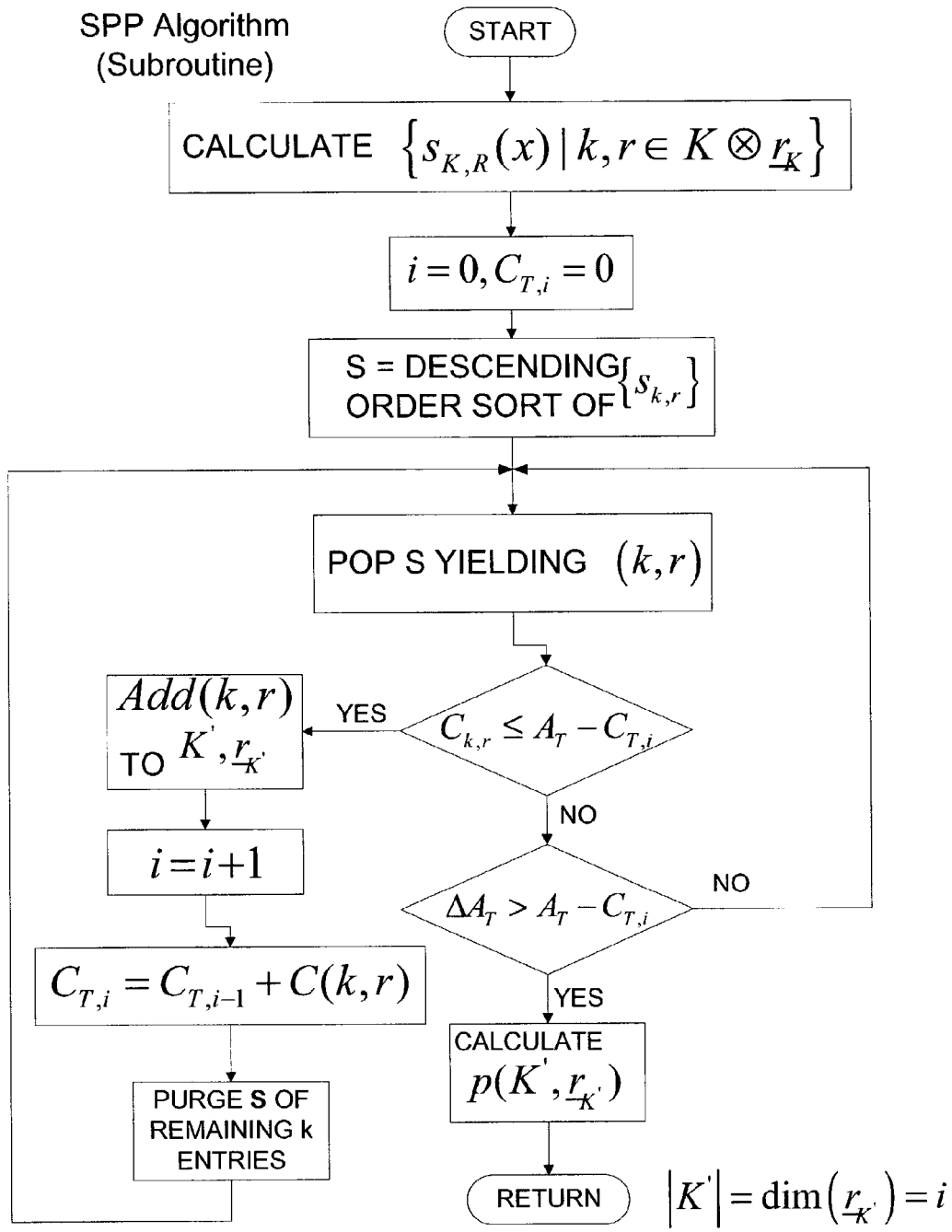
FIG. 4 shows the inner loop of the knapsack satisficing model.

This section summarizes the computational flow for ASPP. ASPP runs in an outer loop that calculates the value of a for the SPP algorithm which runs as a called subroutine. The SPP subroutine returns the $p(K',\underline{r}_k)$ prescribed above. This is the function value to be maximized in the Gold Section search (see Matlab® Source Code below) that yields the desired ASPP solution $(K',\underline{r}_{K'})$. In FIG. 3 and FIG. 4, the symbol x is used for the exponent a.

The Matlab® source code in Listing 1 below may used to implement the features discussed above:

Listing 1

```
% 'ASPPfindXtest2.m' gjr
% algo and test code for one dim search to minimize a function
%                   using Golden Section search (Press, p.296+)
clear all
R = 0.61803399;    % Golden ratio
C = 1 - R;
tol = 1e-6;                              % convergence tolerance
gold = 1/R;
glimit = 5;        % max scaling for parabolic fit to xa,xb,xc
tiny = 1e-20;
%====================bracketing the minimum
xa = -44;         xb = -64;             % start points for bracketing
Ja = Jfun(xa);    Jb = Jfun(xb);        %Jfun( ) is subroutine of minimized function
if Jb > Ja        % Ja>Jb presumed, if not switch
   dum=xa;        xa=xb; xb=dum;
   dum=Ja;        Ja=Jb; Jb=dum;
end
xc = xb + gold*(xb-xa);                 % first downhill trial point
Jc = Jfun(xc);
while Jb>Jc       % execute loop until bracket found - Ja>Jc>Jb
   r = (xb-xa)*(Jb-Jc);
   q = (xb-xc)*(Jb-Jc);
   u = xb - ((xb-xc)*q - (xb-xa)*r)/...
      (2*max(abs(q-r),tiny)*sign(q-r));     % min of parabola from xa,xb,xc
   ulim = xb + glimit*(xc-xb);
   % now test possibilites for a bracket
   if (xb-u)*(u-xc)>0 % min is in (xb,xc)?
      Ju = Jfun(u);
      if Ju<Jc                           % min in (xb,xc)?
         xa = xb;
         xb = u;
         Ja = Jb;
         Jb = Ju;
         break
      elseif Ju>Ja   % min in (xa,xu)?
         xc = u;
         Jc = Ju;
         break
      end
      u = xc + gold*(xc-xb);   % parabolic fit didn't work, use default scaling
      Ju = Jfun(u);
   elseif (xc-u)*(u-ulim)>0 % min is in (xc,ulim)?
      Ju = Jfun(u);
      if Ju<Jc
         xb = xc;       xc = u; u = xc+gold*(xc+xb);
         Jb = Jc;       Jc = Ju; Ju = Jfun(u);
      end
   elseif (u-ulim)*(ulim-xc)>0 % min is beyond ulim?
      u = ulim;     % limit u to its max
      Ju = Jfun(u);
   else                                  % reject parabolic u, use default scaling
      u = xc + gold*(xc-xb);
      Ju = Jfun(u);
```

-continued

Listing 1

```
      end
   % eliminate oldest point and continue
      xa = xb; xb = xc;            xc = u;
      Ja = Jb; Jb = Jc; Jc = Ju;
   end            % end of bracketing loop
%======================start golden section search
   x0 = xa;                           % will track four points x0 thru x3
   x3 = xc;
   if abs(xc-xb)>abs(xb-xa) % then make [x0,x1] the smaller segment
      x1 = xb;
      x2 = xb + C*(xc-xb);
   else
      x2 = xb;
      x1 = xb - C*(xb-xa);
   end
   J1 = Jfun(x1);           J2 = Jfun(x2);
   while abs(x3-x0)>tol*(abs(x1)+abs(x2)) % while convergence criterion not met
      if J2<J1              % one possible outcome
         x0 = x1;        x1 = x2; x2 = R*x1+C*x3;
         J0 = J1;        J1 = J2; J2 = Jfun(x2);
      else                                % the other outcome
         x3 = x2;        x2 = x1; x1 = R*x2+C*x0;
         J3 = J2;        J2 = J1; J1 = Jfun(x1);
      end
   end
   % convergence achieved, output best of two current values
   if J1<J2
      xmin = x1;
      Jmin = J1;
   else
      xmin = x2;
      Jmin = J2;
   end
```

2.2 KABS2

KABS2 is an extension of the above-described KABS1 methodology in that it can be used to buy click-thru (CT) traffic from auction-based source sites that may not be justified by any explicit financial utility—the so-called 'junk traffic'. This is accomplished by letting the KABS operator change the values of one or two parameters so that KABS maximally spends the mandated budget $A_T$ within the nominated set of keywords (KWs). One of these adjusted parameters is $r_{max}$ that delimits the range of display ranks $[1, r_{max}]$ over which KABS can search for a solution set which then becomes the transmitted bid list. For every KW in this list we have the tuple KWid and its related bid $A_{CPC}$ amount which implicitly selects the desired display rank generated by KABS within the source site's current bids (the retrieved bid vector) for that KW.

KABS2 will still attempt to generate the best ROI-based solution now using a utility function that includes the incremental lifetime value $A_{LTV}$ (described elsewhere herein) for the incoming CT traffic. An analysis of the KABS sort function details shows that realistic LTV values have little or no effect on the bid list solution but permit computation and display of the discounted ROI value in order to decide on a judicious size of the 'junk traffic' buy.

The next section contains the necessary formulas and outlines the steps of the algorithm.

The nominated set of KWs on which KABS operates is K. From K KABS selects the solution set K' and its related vector of display ranks $\underline{r}_{K'}$. KABS seeks to maximize the return on investment as its driving utility function. Specifically $$ROI(K', \underline{r}_{K'}) = \frac{\sum_{K'} R_k(r_k)}{\sum_{K'} C_k(r_k)} \tag{79}$$

in which the minus one is left off here and below since as an additive constant it does not affect the maximization required during optimization. The maximization of ROI $(K', \underline{r}_{K'})$ is subject to the constraint of having to spend an amount $A_T$ over time period T (nominally one day and so assumed in the sequel, else all rate/incremental terms should be multiplied by T for other time intervals).

The KW index $k \in K$, the nominated set of KWs for consideration. The submitted bid list is then $(K', \underline{r}_{K'}) \ni K' \subseteq K$. The elements of $\underline{r}_{K'}$, the display rank vector, range in $[1, r_{max}]$. The terms in (79) are defined by $$ROI(K', \underline{r}_{K'}) = \frac{\sum_{K'} [f_{R,k} A_{RPR,k} + A_{LTV}]^V N_{C,k}(r_k)}{\sum_{K'} {}^V N_{C,k}(r_k) A_{CPC,k}(r_k)} \tag{80}$$

where
$^V N_{C,k}$ = number of CTs (click-thrus),
$f_{R,k}$ = redirect fraction,
$A_{RPR,k}$ = weighted average RPR,
$A_{LTV}$ = Lifetime value of CT traffic subsequent to current session, $A_{CPC,k}(r_k)$=effective CPC that was bid at $r_k$, which may have subsequently changed due to the dynamism of the auction process. (The bid amount may also be changed by operating KABS PushDown mode in the interval between optimizations.)

KABS calculates predicted traffic from each KW as $$^V N_{C,k} = N_{C1} g_k(r_k) \tag{81}$$

$^V N_{C1,k}$=The average CTs/day at $r_k$=1.

$g(r)$=normalized negative monotone CT function such that $g(1)$=1. ($g(r)$ is a regression function that fits an observed batch of CTs at known ranks for an appropriate selection of KWs. With sufficient data $g(r)$ may also be computed on a KW basis as indicated in (50). When the search site forwards display rank with the CT, the above described sequential Kalman filter may be used.) This gives total predicted traffic from the bid list as $$^V N_T(K', r_{K'}) = \sum_{K'} {}^V N_{C,k} \tag{82}$$

that is obtained for predicted total cost $$C_T(K', r_{K'}) = \sum_{K'} C_k = \sum_{K'} {}^V N_{C,k}(r_k) A_{CPC,k}(r_k) \tag{83}$$

(In the above equations 82 and 83, we follow the convention for CT terms as $^V(\ )$ 'down and in' and for redirect terms as $^{\wedge}(\ )$ 'up and out'.) The actual 'optimization' to obtain ($K'$, $r_{K'}$) is achieved as a satisficing solution generated by the ASPP (Adaptive Sort Pop Purge) algorithm. The sort function used is $$S_k = \frac{\{[f_{R,k} A_{RPR,k} + A_{LTV}]^V N_{C,k}(r_k)\}^{1+x}}{A_{CPC,k}(r_k)^V N_{C,k}(r_k)} = \frac{[f_{R,k} A_{RPR,k} + A_{LTV}]^{1+x}}{A_{CPC,k}(r_k)} {}^V N_{C,k}(r_k)^x \tag{84}$$

which is computed over K for a range of display ranks and x values as described below. (In the context of ASPP this sort function appears to be an efficient heuristic for solving a class of knapsack problems to which the KABS optimization belongs.)

The general form of the normalized CT rate is $$g(r) = a_1 - \left[\frac{a_1 - a_2}{1 + e^{-c_1(r-b_1)}}\right] - \left[\frac{a_2 - a_3}{1 + e^{-c_2(r-b_2)}}\right] - \cdots \tag{85}$$

which has been designed to yield a family of monitonically decreasing functions that can have a variable number of plateaus of height $a_i$ which transit at locations $b_i$ with a steepness determined by the $c_i$. A convenient form of this function which is regressed with measured CT data that indicates an immediate decay (no plateau) from rank r=1 is $$g(r, \underline{c}) = \frac{\left[1 - \frac{1-c_1}{1+e^{-c_2(r-c_3)}}\right]}{\left[1 - \frac{1-c_1}{1+e^{-c_2(r-c_3)}}\right]} \tag{86}$$

which is completely determined by the constant vector $\underline{c}=[c_1, c_2, c_3]$ and has the property that $g(1,\underline{c})=1$. It is this latter form that has been described above.

2.2.1. KABS2 Algorithm

The KABS2 algorithm is based on a specifically looped version of ASPP Section that cycles through the desired range of x values and ranges of display ranks $[1, r_{max}]$ delimited by a decreasing value of $r_{max}$.

2.2.2. Basic ASPP Algorithm

The basic ASPP algorithm is described above in Section 2.1.2 and consists of the following steps.

1. Input all K-related cash data, performance data, current bid vectors, and select starting values of x and $r_{max}$.
2. Compute $S_k(x, r_{max})$ over K yielding $|K| \cdot r_{max}$ scalar-valued entries along with related values of current and discounted revenues, CPC, and traffic entries.
3. Sort $S_k$ in descending order yielding a sorted array (stack) with each KW=k having $r_{max}$ entries.
4. Pop the stack and compute the cumulative cost of K' with the popped KW=k included. If the cumulative cost is less than or equal to $A_T$, then add KW=k and related data into K' as its last entry and go to Step 6 else go to Step 5. (An alternative here is to test whether the cumulative is within range $A_T \pm \Delta A_T$. If lower, then add KW=k add and continue at Step 6; if within range then add to K' and go to Step 8; if higher go to Step 6.)
5. If cumulative cost exceeds, then purge the single KW=k entry from the stack and repeat Step 4.
6. Purge the stack of the remaining KW=k entries. If the stack is empty then go to Step 8 else go to Step 4.
7. Execute next step of Golden Section search on x to maximize the utility in (1). The alternative to Golden Section is a simple sweep ('silver Section') through a range of x values e.g. 0.00 to 0.20 by steps of 0.01. Go to Step 8 if converged, else take next value of x and go to Step 2.
8. Output all ROI (current and discounted), cash, traffic values, (K', $r_{K'}$) and stop.

2.2.3. The KABS2 Upgrade

KABS2 is required to enforce spending the budgeted amount over K regardless of the ROI consequences. The intent here is to force the purchase of traffic volume for extra-financial business purposes. KABS2 does this by searching for the maximum ROI (48) solution over the x and $r_{max}$ dimensions. If we limit $r_{max}$ to successively lower values in ASPP, then the restricted solution set will yield higher traffic volumes at appropriately higher costs due to the nature of the CT rate function $g(r)$—i.e. $g(r_i) \geq g(r_j)$ for all $r_i < r_j$. From the preceding arguments it is clear that for any value of x we should start with an appropriately high $r_{max}$ and decrease it successively until the budget constraint is met. Decreasing $r_{max}$ further will not yield higher ROI values within the budget, but may yield higher traffic numbers. However, buying traffic at the lowest unit cost or incremental rate is not within the present utility—for a discussion see below entitled "Optimization and Utility Function Notes".

A fast version of this algorithm ('Turbo KABS') involves computing the sort function just once for every x, storing its best solution, and repeating it for successive ('silver Section') x values until a maximum is found. From actual data and theoretical considerations the surface ROI(x, $r'_{max}$) has been found to be unimodal over the range of interest. Therefore the algorithm stops once the peak is found in both dimensions. The following subsection describes this algorithm that is the basis for KABS2.

2.2.4 Turbo KABS Algorithm

The Turbo KABS algorithm embeds the essence of ASPP and consists of the following steps.

1. Input all K-related cash data, performance data, current bid vectors, and select starting values of x and $r'_{max}$.
2. Compute $S_k(X, r'_{max})$ over K yielding $|K| \cdot r'_{max}$ scalar-valued entries along with related values of current and discounted revenues, CPC, and traffic entries.
3. Sort $S_k$ in descending order yielding a sorted array (stack) with each KW=k having $r'_{max}$ entries. Store this as the BigSort(x, $r'_{max}$) stack and set $r_{max} = r'_{max}$.
4. Set TempSort=BigSort. Pop TempSort and compute the cumulative cost of K'(x, $r_{max}$) with the popped KW=k included. If the cumulative cost is less than or equal to $A_T$, then add KW=k and related data into K'(x, $r_{max}$) as its last entry and go to Step 6 else go to Step 5. (An alternative here is to test whether the cumulative is within range $A_T \pm \Delta A_T$. If lower, then add KW=k add and continue at Step 6; if within range then add to K' and go to Step 7; if higher go to Step 6.)
5. If cumulative cost exceeds, then purge the single KW=k entry from the stack and repeat Step 4.
6. Purge the stack of the remaining KW=k entries. If the stack is empty then go to Step 7 else go to Step 4.
7. For current value of x output all ROI (current and discounted), cash, traffic values, and [x, K'(x, $r_{max}$), $r_{K'}$].
8. Examine previous best value of the triplet [x, K'(x, $r_{max}$), $r_{K'}$]. If current value has higher ROI, then make current solution the Best solution for current value of x and go to Step 10, else retain Best.
9. If $r_{max}=1$, then select Best as the best solution for current x and go to Step 10; else purge BigSort of all $r_{max}$ entries yielding BigSort(x, $r'_{max}-1$), decrement $r_{max}$ and go to Step 4.
10. Examine Best from previous values of x. If current Best has higher ROI, then make current solution the overall Best solution, save replaced solution as LastBest if it is better than existing LastBest, else discard, and go to Step 11. If current solution is not better than Best and is better than LastBest, then replace as LastBest and go to Step 11. Else if current solution is not better than Best and LastBest then retain Best and go to Step 12.
11. Execute next step of Golden Section search on x to maximize the utility in (1). The alternative to Golden Section is a simple sweep ('silver Section') through a range of x values e.g. 0.00 to 0.20 by steps of 0.01. Go to Step 2.
12. Output Best solution and stop.

2.2.5. KABS2 Operating Modes

KABS2 will continue to operate in two basic modes—optimization and pushdown. In one possible embodiment, KABS goes through a daily operating cycle in which each mode is executed once. The operation of KABS can be made possible through a dedicated UI. This section summarizes the operating modes and highlights an interactive mode.

2.2.5.1. PushDown Mode

In this mode the KWs in K' are checked and if any of the bids are found to be 'floating' above the next lower bid by more than a designated amount (e.g. one cent), then the floating bids are pushed down by rebidding them to within the designated amount. PushDown does not change the current display rank of a KW, but only seeks to pay the minimum amount to maintain that display rank. Due to the dynamism of the auction process, the general behavior of KWs is to increase in display rank over time if only PushDown is successively executed. This will cause a natural decrease in costs and resultant traffic volume from K'.

2.2.5.2. Optimization Mode

Running the Optimization involves executing the KABS2 algorithm over a subset of K. Optimization affects both membership in K' and the determination of corresponding display ranks (as described below) for the bidset of KWs.

2.2.5.2.1. Nominated KW Set

The nominated set K consists of all the words from which the bidset K' is selected. Due to the desire to mandate some KWs in K for inclusion in K', KABS will operate on the mandated set in different ways as described below. Mandating is useful for responding to current merchandising trends and for inserting new KWs in the bidset for the purpose of gathering performance data on them.

2.2.5.2.2. Mandated KW Sets

The mandated set K" is a proper subset of K. Mandating may further be divided into two types.

2.2.5.2.2.1. Soft Mandated KWs

Soft mandated KWs have only their membership in K" specified. The display rank of soft mandated KWs is to be selected by the KABS optimization algorithm. The modification of the algorithm to accomplish this is straightforward and involves doing two sorts—one for K" and the other for the remaining K\K" KWs. Then the sorted K" subset is placed at the top of the BigSort stack (§2.2.4) and the algorithm proceeds as described.

2.2.5.2.2.2 Hard Mandated KWs

Hard mandated KWs have both their membership and display rank specified. It is becomes a semantics issue as to whether hard mandated KWs should actually be included in the KABS process at all. They are included here for administrative purposes so that the bidset for all KWs to be purchased from a search site can be handled at one time through one system. Hard mandated KWs are treated by placing them in the bidset first, computing their cost from the current bid vectors (retrieved normally from the search site), and then removing their Kwids from K and the cost from the total budgeted amount for the 'current buy'. This leaves the actual KABS budget $A_T$ and the set K with only soft mandated KWs in K" and unmandated KWs to be operated on as described above.

2.2.5.3. Manual Editing Mode

One possible implementation of KABS may permit inspection and manual editing of the KABS computed bidset (K'). This will be achieved through a graphical display of the KABS solution. Since KABS assigns KWs to the bidset in a descending order of the best to the worst performing KW, it is possible to create an integrated plot that summarizes the performance of the bidset as a function of its increasing membership.

Figure 9:
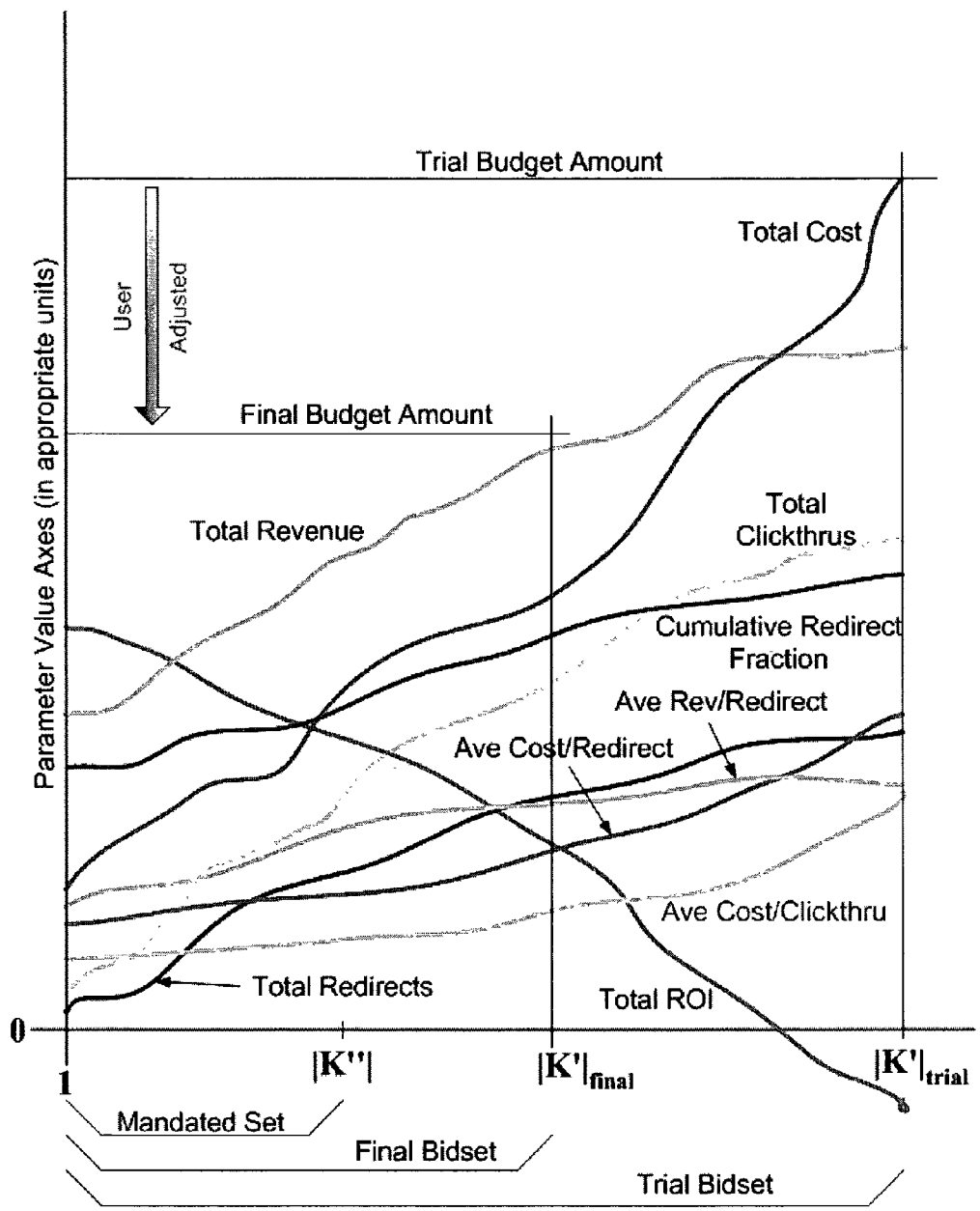
FIG. 9 displays various KABS performance parameters as function of bidset size.

We include in FIG. 9 such a plot showing the concurrent display of the predicted values For—

Total ROI
Total Revenue
Total Cost

Total Click-thrus
Total Redirects
Total Redirect Fraction
Average Revenue per Redirect
Average Cost per Redirect
Average Cost per Click-thru This informational format permits the user to evaluate the performance of the current bidset and override it by selecting another cutoff point for the number |K'| of KWs in the bidset to be actually submitted. Since optimization was done only up to and including K', the User may always examine the region beyond the actual or final budget amount $A_T$ by executing the optimization with a trial amount $A'_T > A_T$. He can then back off manually to any desired point while examining the above listed performance parameters. It is clear that not all functions need to be displayed concurrently. Clicking on a specific trace would cause the vertical axis to be calibrated in the appropriate units. The final budget amount can be dragged down to automatically generate the updated final bidset.

2.2.6. Example Deployment of KABS Utility Function (KABS2) Consumer Lifetime Value—The Short Form The following illustrates one of many possible uses for KABS2. This example is for illustrative purposes, and it is not intended to limit the scope of the present invention. The assignment of consumer lifetime value (LTV) is required for many business decisions by a marketplace infomediary such as BizRate.com. This section presents a quick formula for the computation of the LTV of a new visitor (newbie) to an infomediary website which may, under certain assumptions, also be applied to return visitors.

In order to expend resources on attracting visitors who are not monetizable in the current session—e.g such as bidding for keywords at a traffic source site—the infomediary often buys traffic 'on the come'. The theory being once a visitor has been exposed to the site's services that they are likely to come back at a certain frequency in the future and execute revenue generating redirects to the infomediary's clients. This is sometimes analyzed under rubric of 'loyalty' within the understanding that a fraction of a given cohort of newbies joins a pool of consumers that continue to frequent the site at a specified average rate. When such repeat visits do occur, these consumers then redirect at a given redirect fraction thereby generating a postulated contribution to margin. This behavior may go on indefinitely or may be assumed to cease after a period of time that defines the 'horizon' of the resulting LTV estimate.

A simple and effective measure of such LTV may be computed from the discounted cash flows of such visits that do not include the current visit.

The example presented covers a cohort of 1,000 consumers who come to a site that redirects 40% of its visitors which generate a $0.25 contribution to margin per redirect. The cohort consists of 80% newbies whose loyalty is expected to quickly decay to a permanent 3% floor with the passing of time. From past data the infomediary postulates that the 'loyal' consumer makes an average of 12 visits a year. Assuming a discount rate of 8% we can compute the indefinite (infinite) and, say, two year horizon LTVs.

For the indefinite horizon we obtain the incremental LTV of $0.37 per newbie giving a total of $373.02 new LTV contribution from the 1,000 member cohort. The same values for a two-year horizon are $0.05 and $53.21 respectively. The undiscounted amounts for the two years are $2.40 per all one-time revisits from the original cohort and $57.60 the total contribution to margin generated from the original cohort of 1,000. These results are shown in FIG. 10.

2.2.6.1. Example Optimization and Utility Function Notes

The present invention may be used in situations where an infomediary is formulating new "products" for seller clients that involve making a commitment to deliver traffic numbers within at least some specific ranges. While the deal points on such products may vary, it appears likely that they would often involve purchasing KWs with specified traffic performance parameters in mind. Under certain conditions, this may require reformulation of the KABS' utility function to explicitly include a traffic attribute. We recall that optimization is always done by finding a solution that maximizes a subjectively formulated utility function (more generally, that extremizes a subjective criterion function). For KABS this is the sum of revenues from the bid list divided by the sum of all costs which may be constrained to a budgeted amount.

KABS is designed to maximize the return from a budgeted investment over a designated time period when it selects the bid list of keywords (KWs) from a much larger candidate list that is presented to it. The KWs in their various possible display rank alternatives—numbering, perhaps, in the tens of thousands—are all considered on their financial merits only. The amount of traffic KABS drives into a website is not explicitly a consideration and enters only through the way it affects each KW's total cost through its CPC (cost per click we bid) and total revenues generated through its RPR (weighted average revenue per redirect). The optimization technology is so designed, however, that it intrinsically favors the ROI made up of larger revenues over the equal ROI based on smaller revenues. Since larger dollar sums usually come from larger traffic flows, KABS' bias therefore already designed to favor higher traffic volumes. In the final analysis, the KABS solution does provide the most traffic possible for maximizing the ROI from the budgeted traffic dollar.

KABS may include an interactive graphics mode for overriding the automated solution and allowing the operator to manually reduce the budget from a high trial amount to generate a new bidlist that satisfies unstated criteria which may be imposed on the behavior of the graphic display of KABS results. The several possibilities of this operating mode are made clear in FIG. 9.

When we depart from the above strategy, then we must recognize that we are going for solutions that are driven by definitions of utility that do not derive the maximum immediate return from the budgeted amount. This requires the use of KABS2 for which we consider several alternative utility functions that explicitly favor high traffic numbers, perhaps along selected pathways.

1. If we just want to maximize the number of redirects for the budgeted amount not explicitly caring about the revenues generated (See $J_1$ below).
2. In the simplest extension of KABS we might just include a total traffic term into the functional expression of utility. It could be appropriately weighted in relation to the ROI (see $J_3$ and $J_4$ below).
3. If for a KW we are required to drive as many consumers as possible to a designated seller site, then we must attract as many as possible from the source (search) site since the fraction we redirect for a KW is independent of the number we attract. This means that certain nominated KWs must be treated differently (i.e. categorically) in the utility function and therefore cannot be handled by KABS. But in the process we must rationalize the question, 'will we be making commitments to deliver traffic to merchants on the basis of differential returns to us?—i.e. will situations arise where we want to deliver more traffic to merchant X who pays less per redirect and less traffic to merchant Y who pays more per redirect?

4. If for a KW category we desire to drive more traffic to a given group of merchants not caring how the redirect traffic distributes itself among the group.

5. If we can quantify a lifetime value (LTV) for traffic through a certain category of KWs that is beyond their immediate contribution to RPR. This would suggest a utility that considers the effective revenue from such traffic as the sum of the immediate RPR and the LTV (see $J_5$ and $J_6$ below).

6. If we can quantify a lifetime value (LTV) for traffic to a certain category of Sellers that is beyond their immediate contribution to RPR. This would suggest a utility that considers the effective revenue from such traffic as the sum of the immediate RPR and the LTV.

7. If we need to consider various combinations of the above.

We outline the next steps in this work at the end of this section.

We now consider some candidate functional forms that explicate some of the above cases. As a review and point of departure, we start with the KABS utility function for optimization and its related ASPP sort function.

2.2.6.1. KABS Utility $$ROI(K', r_{K'}) = \frac{\sum_{K'} R_k(r_k)}{\sum_{K'} C_k(r_k)} \quad (87)$$

in which the minus sign is left off here and below since as an additive constant it does not affect the maximization required during optimization. The KW index $k \in K$, the nominated set of KWs for consideration. The bid list is then $(K', r_{K'})$ ∋ $K' \subseteq K$. Elements of $r_{K'}$, the display rank vector, range in $[1, r_{max}]$.

$$R_k = N_{C,k} f_{R,k} A_{RPR,k} \quad (88)$$

$$C_k = N_{C,k} A_{CPC,k}(r_k) \quad (89)$$

$N_{C,k}$=number of CTs (click-thrus),
$f_{R,k}$=redirect fraction,
$A_{RPR,k}$=weighted average RPR,
$A_{CPC,k}(r_k)$=effective CPC that was bid at $r_k$, but may have subsequently changed.

$$N_{C,k} = N_{C1}g(r_k) \quad (90)$$

$N_{C1,k}$=The average CTs/day at $r_k$=1.
$g(r)$=normalized negative monotone CT function such that $g(1)=1$.

$$^{v}N_T(K', r_{K'}) = \sum_{K'} N_{C,k} \quad (91)$$

(Note that in the above equation, we follow the convention for CT terms as $^{v}( )$ 'down and in' and redirect terms as $^{\wedge}( )$ 'up and out'.)

5 2.2.6.2. KABS2 Utility Candidates

The following are various forms with explicit dependence on CT and redirect traffic. We use the literature convention of J as the criterion or utility function.

$$J_1 = \frac{\text{total redirects}}{\text{total cost}} = \frac{^{\wedge}N_T}{C_T} = \frac{\sum_{K'} f_{R,k} N_{C,k}}{\sum_{K'} C_k}. \quad (92)$$

here maximizing $J_1$ attempts to maximize the number of redirects per CPC paid. The ASPP sort function can be $$S_k = \frac{^{\wedge}N_{R,k}^{1+x}}{C_k} \quad (92)$$

where x is the 'stretch' exponent that favors higher traffic at the same number of redirects per RPR.

$$J_2 = wROI + (1-w)^{\wedge}N_T \quad (93)$$

where $w \in [0,1]$. At w=1 we get $J_2$=ROI, the KABS1 utility presented above. At w=0, $J_2$ attempts to maximize the number of redirects for the budgeted amount. Since $^{\wedge}N_T$ and ROI are of greatly different magnitudes (and units), the effect on $J_2$ will 'feel nonlinear' when w departs significantly from 1. An appropriately large threshold $^{\wedge}N_{NOM}$ can be introduced to 'normalize' $J_2$ as $$J_3 = wROI + (1-w)\frac{^{\wedge}N_T}{^{\wedge}N_{NOM}} \quad (94)$$

A candidate sort function for $J_3$ is then $$S_k = wROI_k + (1-w)\frac{^{\wedge}N_k^{1+x}}{^{\wedge}N_{NOM,k}} \quad (95)$$

where the stretch is applied to the redirect traffic from KW=k. Although not indicated in this presentation, the weight w may also be made specific to a KW or KW category giving $_{wk}$ in such weighted utilities and sort functions. We recognize $$ROI_k = \frac{R_k}{C_k} = \frac{f_{R,k} A_{RPR,k}}{A_{CPC}} \quad (96)$$

$$^{\wedge}N_k = f_{R,k} {}^{v}N_{C,k} \quad (97)$$

where the 'down V' is added for emphasis to denote the incoming CTs. Then the total redirects are $$^{\wedge}N_T = \sum_{K'} {}^{\wedge}N_k \text{ and } {}^{\wedge}N_{NOM} = \sum_{K'} {}^{\wedge}N_{NOM,k} \quad (98)$$

(Note that the nominal values $N_{NOM,k}$ can be updated regularly (e.g. daily as the last 7 days' moving average) to reflect changing traffic trends for each KW or KW category.) Or in product form $$J_4 = ROI\hat{\ }N_T \qquad (99)$$

requires no $\hat{\ }N_{NOM}$ and could be sorted by $$S_k = ROI_k\hat{\ }N_k^{1+x} \qquad (100)$$

or, if more emphasis on financial performance is desired, then $$S_k = \frac{\hat{\ }N_k R_k^{1+x}}{C_k} \qquad (101)$$

2.2.6.3. Life Time Value (LTV) Considerations

If a discounted form of LTV is attributed to CT traffic then the total discounted ROI may be expressed as $$J_5 = \frac{\sum_{K'}[R_k + \check{\ }N_{C,k}R_{LTV}]}{\sum_{K'}C_k} = \frac{\sum_{K'}[f_{R,k}A_{RPR,k} + R_{LTV}]\check{\ }N_{C,k}}{\sum_{K'}C_k} \qquad (102)$$

To maximize $J_5$ we again would sort by $$S_k = \frac{[R_k + \check{\ }N_{C,k}R_{LTV}]^{1+x}}{C_k} \qquad (103)$$

It is seen that $R_{LTV}$ acts like a weight on $N_{C,k}$ which appears explicity in $J_5$. $R_{LTV}$ can be assigned broadly or made specific to a category of KWs, say, in consumer electronics. From (102) we see that the LTV of a consumer is computed from a future cash stream that excludes revenues from the current user session. Finer control can be exerted between current and future revenues by again inserting w as defined above. This gives $$J_6 = \frac{\sum_{K'}[wf_{R,k}A_{RPR,k} + (1-w)R_{LTV}]\check{\ }N_{C,k}}{\sum_{K'}C_k} \qquad (104)$$

and $$S_k = \frac{\{[wf_{R,k}A_{RPR,k} + (1-w)R_{LTV}]\check{\ }N_{C,k}\}^{1+x}}{C_k} \qquad (105)$$

2.3. KABS3

2.3.1. Introduction

Figure 14:
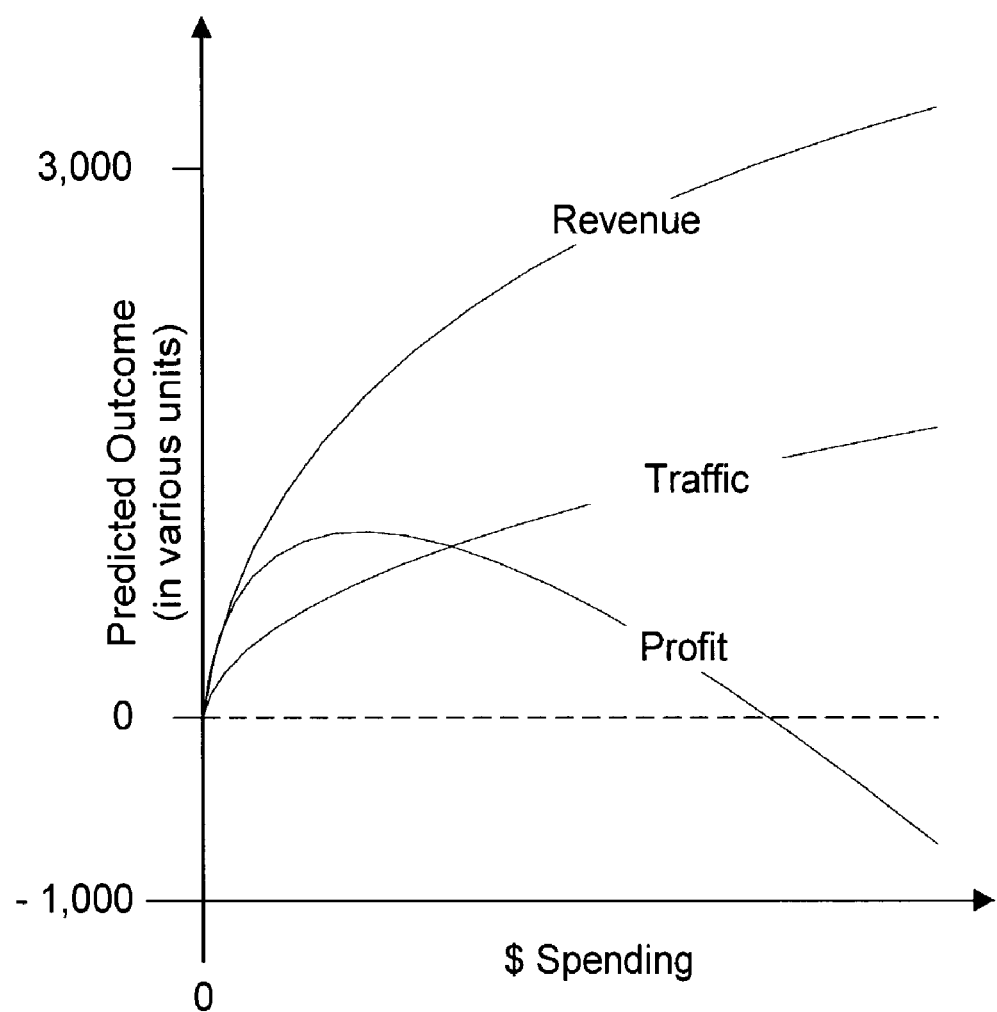
FIG. 14 illustrates the optimal amounts of redirects, revenue and profit attainable over a range of $ spending.

The KABS3 algorithm provides an alternative solution to the utility maximization problem. KABS3 optimizes profit for a given level of total spending. For any given level of total spending, there exists a maximum profit that is achievable subject to the constraints of the system. KABS3 systematically increments spending, from 1 cent through higher stopping points, calculating the maximum achievable profit at each incremental spend level and the associated keyword ranks/bids to achieve that profit. The double-valued line labeled Profit in FIG. 14 is KABS3's estimation of maximum profit; for each data point in the graph, KABS3 has calculated the keywords and ranks required to achieve that profit.

Both redirects and revenue increase monotonically with spending. Profit climbs to a peak and then declines. The user can specify the system output as the keyword ranks/bids that have the spend versus profit/revenue/redirect profile that maximizes utility.

2.3.2. KABS3 Operating Modes

KABS3 can be run in one of three modes, each mode defined by a rule that specifies a stopping point on the graph above.

2.3.2.1. Maximize Profit Mode

Keyword bids are chosen to ensure that total spending is that which maximizes profit. This is picking the keyword/bid set to hit the point where the Profit curve in FIG. 14 has as close to a zero first derivative as possible.

2.3.2.2. Fixed Spend Mode

The user picks a fixed spend amount (i.e., point on the X axis in FIG. 14). Keyword bids are then those that KABS3 associated with the point to give the maximum profit estimate.

2.3.2.3. Degraded Profit Mode

In order to take into account the value of traffic (see 2.2.6.1. KABS2 Utility), the user can pick a reduction from maximum profit (e.g., 80% of maximum gives degradation target DT=0.8 ) to gain additional redirects and revenue. KABS3 will then calculate the minimal spend that hits this reduced profit threshold where the spend is greater than that for maximum profit. KABS3 will follow the profit curve down from its maximum point, picking the keyword/bid set from the point where the curve hits the reduced profit target.

2.3.3. KABS Algorithm

Appendix B, hereby incorporated by reference, contains a listing of source code which implements the KABS3 algorithm discussed in this section.

Like ASPP, KABS3 is a greedy algorithm. The key difference is that it maximizes at each step ROI rather than margin, and that it is capable of changing the bid rank $\underline{b}_k$ for a keyword at each pass. KABS3 allows the rank of a keyword to change on each pass—unlike KABS1 and KABS2, it does not attempt to find the single best rank for a keyword and insert it at the appropriate time, never again revisiting that keyword. Keywords are entered initially at their lowest (highest ROI) rank—with each pass a single keyword is then promoted a single rank. KABS3 is greedy in that each pass results in the most immediately optimal solution because the keyword promoted is that which will result in the highest ROI for the resulting knapsack.

For a given keyword k, ROI is assumed to decrease with rank. This is because $A_{CPC,k}$ by definition increases, while $A_{RPR,k}$ by definition remains constant and $f_k$ should remain constant (if anything, it decreases with rank). Costs per unit increase while revenue per unit holds constant. Therefore, greedy optimization of ROI (which is equivalent to optimization of profit for the spend under consideration at the current pass) will always enter a lower $\underline{b}_k$ for a given keyword before a higher one (lower means lower rank/cost). By extension, if a keyword is entered at rank r, then it must already exist in the knapsack at rank r−1. Therefore, the estimated incremental effect (cost,revenue,redirects) of the keyword at rank r is the difference between the effects at rank r and r−1.

Introducing the notation that a subscripted b represents a bid rank, with b−1 being a rank just below (cheaper than) b, estimated effects are $$CI_{k,b}=A'_{CPC,k,b}g_k(r_{k,b})-A'_{CPC,k,b-1}g_k(r_{k,b-1})\qquad(106)$$

Incremental Cost: rank b−1 to b, keyword k $$RI_{k,b}=g_k(r_{k,b})f_kA_{RPR,k}-g_k(r_{k,b-1})f_kA_{RPR,k}\qquad(107)$$

Incremental Revenue: rank b−1 to b, keyword k

Then, $$ROII_{k,b}=RI_{k,b1}CI_{k,b}\qquad(108)$$

Incremental ROI: rank b−1 to b, keyword k 2.3.3.1. Degraded Profit and Fixed Spend Modes Algorithm Phase 1
   $\forall k \in K$ and $b \in$ {legal ranks for k}, calculate $ROII_{k,b}$ according to (108), except at the minimal b, where $ROI-I_{k,b}$ is the simple ROI. Call the resulting set of all keyword/bid combinations Å.
   Sort Å in descending order of $ROII_{k,b}$.
   LOOP
   Pop the top (highest $ROII_{k,b}$) keyword/bid combination and place in the knapsack.
   Update the estimated total spend and revenue by adding $RI_{k,b}$ and $CI_{k,b}$ to the appropriate totals.
   UNTIL $ROII_{k,b}$ is ←0
   If operating mode is Maximum_Profit GOTO PHASE 3

Phase 2
   LOOP
   Pop the top (highest $ROII_{k,b}$) keyword/bid combination and place in the knapsack.
   Update the estimated total spend and revenue by adding $RI_{k,b}$ and $CI_{k,b}$ to the appropriate totals.
   UNTIL DT * maximum profit obtained in first loop=current total estimated profit [total estimated revenue−total estimated costs]).

Phase 3
   Output bid table consisting of highest bid in knapsack for each $k \in K$ 2.3.3.2. Maximum Profit Mode Algorithm The above algorithm is relevant when running under budget constraints (Fixed_Spend) or Degraded_Profit (this has an implicit constraint because we want to hit the target with minimum spend). If run in simple Maximum_Profit mode, the problem is no longer a true knapsack problem as there are no required tradeoffs—each keyword can be bid at the point that generates maximum profit for it, without regard to the other keywords. Therefore, the algorithm in this case simply consists of picking the highest margin ($A_{M,k,b}$) rank b $\forall k \in K$, and bidding all keywords where the expected value of this rank for the keyword is >0.

3. Computer Implementation of the Present Invention

Persons skilled in the art will appreciate the foregoing methods may be stored in a computer readable media and implemented over a single computer system or a distributed computer system.

Figure 11:
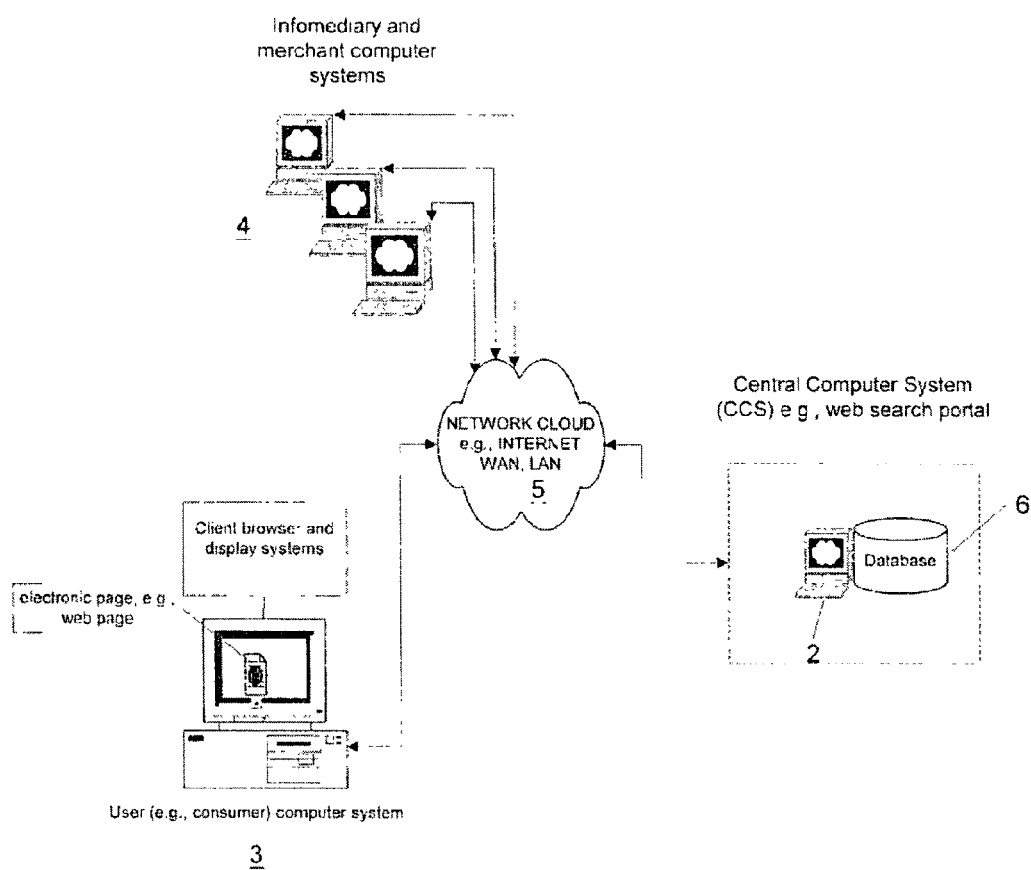
FIG. 11 illustrates a typical computer implementation of the present invention.

FIG. 11 shows an overview of system 1, according to the present invention. The system 1 includes a Central Computer System ("CCS") 2, which would typically host a web search portal, one or more consumer or client computer systems 3, and a plurality of infomediary and merchant computer systems 4. The infomediary (or bidder) computer system would typically execute one or more features of the present invention. Computer systems in system 1 may be networked over LANs, WANs, VPNS, the Internet or other known network systems 5 using known protocols for such systems, including TCP/IP.

Figure 12:
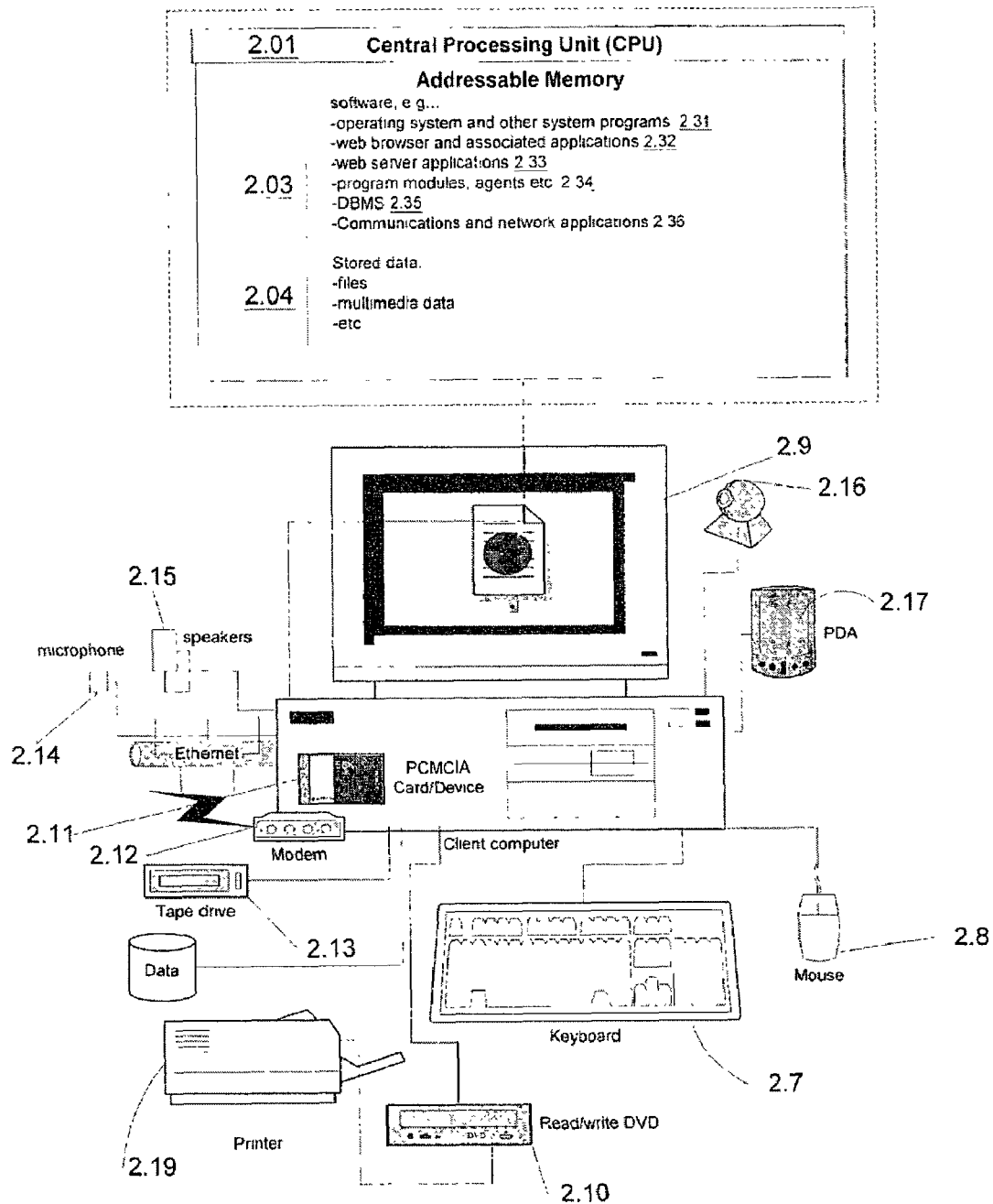
FIG. 12 illustrates features typically found in the hardware and software components on which the present invention can be implemented.
Figure 13:
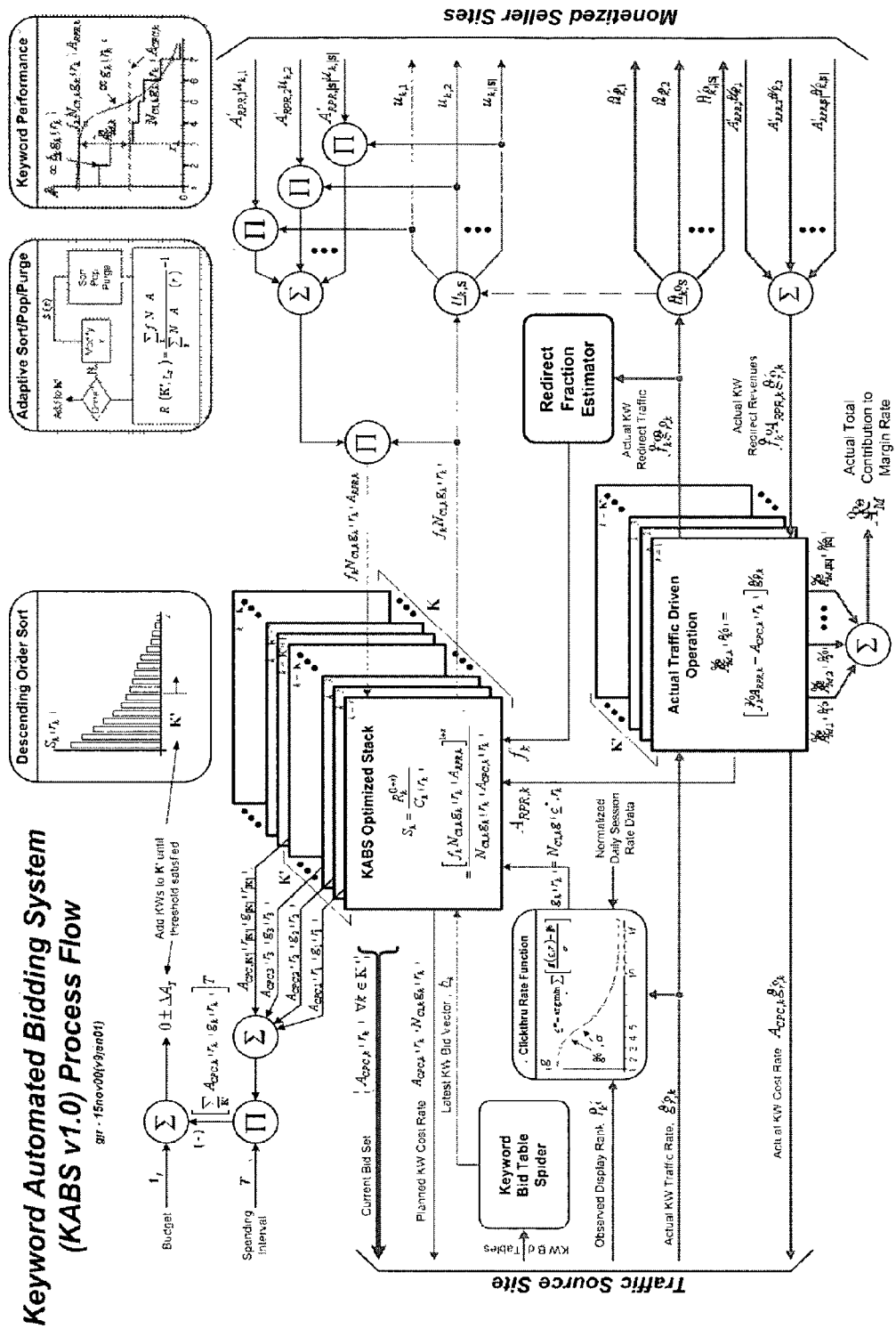
FIG. 13 presents a detailed view of the present invention's process flow.

FIG. 12 illustrates features that may be typically found in a computer system 2, 3, or 4 in system 1. As used herein a "computer system" generally means a set of hardware and software components as is known in the art. A computer system 2, 3, or 4 generally includes: central processing unit ("CPU") 2.01; memory (ROM and RAM) 2.02, e.g. a hard disk drive and associated RAM devices; programs in memory 2.03, including operating system 2.31, web browser applications 2.32 and/or web server applications 2.33, user applications or utilities 2.34, database management system (DBMS) 2.35, communications and network applications 2.36, e.g., email, and network interface systems. Memory 2.02 would also include stored data 2.04.

A computer system may include one or more of the following input/output devices: keyboard 2.7, mouse 2.8, display monitor 2.9, read/write drive 2.10 for removable media, e.g., DVD drive, PCMCIA card 2.11, modem 2.12, backup storage device 2.13, e.g., tape drive, audio capture device 2.14, e.g., microphone, audio output device 2.15, e.g., stereo speakers, still or motion image capture device, e.g., camera 2.16, and an associated computer device for data upload or download, e.g., PDA 2.17, and/or a printer 2.19.

It will be understood by persons skilled in the art that a computer system 2, 3, or 4 may also be in the form of a Personal Digital Assistant (PDA), a wireless computer system or device capable of communications over the Internet or other network, or a computer terminal (thin client) or Internet appliance capable of such network communications.

A computer system 2, 3 or 4 in system 1 may be in the form of a distributed system, not under a single housing or roof, but having the distributed components logically coupled and under the operational control of a party.

Computer systems of system 1 may execute a conventional operating system 2.31, including, but not limited to, Microsoft Corporation's Windows (sm) 3.x, 95, 98, 2000, ME, XP, Professional, NT or DOS operating systems; Linux operating systems; Unix operating systems such as Sun Microsystems' Unix Solaris, IBM's AIX Solaris, SGI's IRIX Solaris; Apple OS, BE OS or other operating systems, including, but not limited to Window's CE, Palm OS, etc. for PDAs, cellular devices, web devices, or other computing devices. The possible software components of a computer system 2, 3 or 4 described herein, including operating system and application software, may reside on one or more hardware components providing addressable memory for the computer system.

Data and information may be formatted by a party's computer system for printing, viewing, transfer to another computer system, storage in any of many known formats, including, Adobe PDF; rich text (RTF); SGML formats including HTML, DHTML and XML; ALLAIRE Cold Fusion CFML; MICROSOFT ASP; JAVA Script MICROSOFT Word, Excel, Access; bitmap, JPEG, GIF, and other graphics file formats. It could also be presented in known audio or video formats such as WAV, MPEG, and MP3 formats.

The electronic data file may be served via known protocols, such as TCP/IP, and formatted in known formats of standardized mark up languages such as HTML and XML. Web documents generally means electronic documents that may be presented through conventional web browser applications such as the INTERNET EXPLORER series of web browser applications by Microsoft Corporation, or the NETSCAPE COMMUNICATOR series of web browsers by Netscape Communications Corporation. As used herein, "client"

means a computer system that makes a request to or receives fulfillment of a request from another computer system. "Server" means a computer system that receives and/or fulfills a request from another computer system. Also, as used herein the term "computer system" may be used interchangeably with "computer", "computing device", "machine", "system having computational resources" or like terms.

A computer system 4 executing features of the present invention may include various external interface applications for converting incoming data, such as form data, to a format for communication with the respective application module or database. The system may also include various external service modules for obtaining information in a format required by the external service. The system may also include a notification module. This module handles notification and electronic mail communication with client systems. The system may include a database interface module. This module handles all interface requirements between application modules and the databases. For example, the database interface application manages (a) the simultaneous connections to the database such that the total number is maintained within applicable license agreements; and (b) any integrity problems in interactions between application modules and the databases. Thus, this module allows the system to be connected to different types of databases such as relational databases or object-oriented databases. Another function that may be included in the system is a consumer profile/settings module. This module receives the consumer profile and settings data sent to the system and performs intake operations on the data so that it may be used in other modules or assigned to databases.

The present invention contemplates that different parties may create and manage database records, input and manage data, upload files, communicate, compute data, collaborate, and exchange things with each other through their respective computer systems. The data and files may be transferred or presented to computer systems by participating parties via user interfaces developed in Standardized General Markup Languages (SGML), scripting languages, and other known languages or protocols. Such languages and protocols include MICROSOFT ASP, CFML, JAVASCRIPT, JAVA, COM, CGI, HTML, DHTML, and/or XML. To provide the foregoing functionality, the user interfaces would typically be in the nature of electronic documents such as web documents or email documents that, through appropriate computer code from such languages, are associated with databases, web servers, web browsers, file servers, network communications links, email programs, etc. The electronic documents could be static documents stored on a server or database or documents created dynamically through server function calls, for example.

Databases may be based on any number of known DBMSs, including hierarchical databases, network databases, relational databases, and object-oriented databases. Suitable DBMSs are widely available and include Oracle, Sybase, Microsoft SQL Server, open source MySQL, and DB2. One suitable database system is a relational database based on Structured Query Language (SQL). A suitable SQL database would typically include a Data Definition Language (DDL) for creation of a new database and new objects within an existing database; a Data Manipulation Language (DML) for processing existing database objects; and a Data Control Language (DCL) for administering permissions and other security-related issues. The data processing is handled by a database engine and can be accessed by various querying means, including Boolean logic evaluation, proximity calculations, and fuzzy logic evaluation. The search engines and databases of the present invention may also be custom designed, the design process and features being well within the skill of persons in the art. U.S. Pat. No. 5,983,220 of Schmitt, entitled "Database Evaluation System Supporting Intuitive Decision in Complex Multi-Attributive Domains Using Fuzzy, Hierarchical Expert Models" discloses, among other things, systems and methods for constructing and querying databases and returning and presenting results of database queries. The '220 patent is hereby incorporated by reference for all that is disclosed therewithin as if set forth herein in its entirety.

The computer systems suitable for use may include or otherwise be directly associated with a web server and associated database. As used herein, a web server generally refers to a computer system that hosts software that enables access by remote computer systems or terminals via the Internet or other network transport. The web server may permit one or more of the following: presentation of data and information, typically in the form of web documents or streaming media; data and information storage and transfer; and other transactions or processes that are capable through web servers. Suitable web server software is widely available and includes Apache Software Foundation's Apache Server web server; Netscape's FASTTRACK series web server, Microsoft Corporation's Internet Information Server, IBM's WebSphere, and Sun Microsystem's JAVA WEB SERVER. A web server in CCS 2 may run appropriate scripts to capture data, to process captured data, or to present processed data. A web server of CCS 2 may receive into or present data from an associated database or other data source to remote computer systems 3, 4, or other remote system, over a network 5. The data may be presented in any known format or mechanism, including HTML, XML, PDF, CFML, MICROSOFT ASP, and as graphic, audio, video and multimedia formats, and others.

The foregoing embodiments and features are for illustrative purposes and are not intended to be limiting persons skilled in the art capable of appreciating other embodiments from the scope and spirit of the foregoing teachings.

While the inventor understands that claims are not a necessary component of a provisional patent application, and therefore have not included detailed claims, the inventor(s) reserve the right to claim, without limitation, at least the following subject matter.

We claim:

1. A computer implemented bidding method for use in bidding on auction items that allows for a desired optimization of bid amounts over a plurality of biddable items comprising:

determining a plurality of current bids for the plurality of biddable items, wherein for a biddable item the auction offers a ranking for received bids according to bid amounts;

calculating via a processor a plurality of bid amounts for a given bidder for achieving a desired optimized outcome from the bidding based on a given computer-implemented utility function retrievable by the processor from a memory and executable by the processor, subjectively formulated for the bidder wherein the calculating comprises estimating the ranking of a bid amount for a first biddable item, estimating the ranking of a bid amount for a second biddable item, and comparing the estimated incremental effect of obtaining a higher estimated ranking for the first biddable item with estimated incremental effect of obtaining a higher estimated ranking for the second biddable item; and;

submitting for the given bidder the plurality of bid amounts to an operator of an auction.

2. The method of claim 1 wherein the computer-implemented utility function, subjectively formulated for the bidder, is used to calculate the estimated incremental effect on maximum profit or maximum return on investment based on a cost of the successful bid and an estimate of the resale value of the biddable item, wherein the utility function considers whether the estimated incremental effect of a lower ranking rather than a higher ranking for each biddable item in the plurality can yield a higher return on investment.

3. The method of claim 1 wherein the ranking comprises a ranked inclusion in a search results list on a webpage available to online users, and the utility function is based on an actual or estimated level of traffic from online users selecting the link to the webpage.

4. The method of claim 1 wherein the determination of current bids includes a determination of the nearest bid below the current bid.

5. The method of claim 1 wherein the determination of current bids includes a determination of the nearest bid above the current bid.

6. The method of claim 1 wherein the determination of current bids includes a determination of the nearest bid below and above the current bid.

7. The method of claim 1 wherein the biddable items are a plurality of keywords auctioned by the operator of an online search engine and the computer implemented bidding method optimizes cost per click for existing keywords by decreasing the bid amount to a predetermined amount above the next lower bid.

8. The method of claim 7 wherein the predetermined amount is the minimum monetary increment above the next lower bid.

9. The method of claim 1 wherein the computer-implemented cardinal utility function has a discrete numerical value for each given ranking.

10. The method of claim 1 wherein the computer-implemented utility function further comprises a click-thru rate estimator function.

11. The method of claim 1 wherein the computer-implemented utility function further comprises selecting an optimal value for the ranking.

12. The method of claim 1 wherein the desired optimized outcome of the computer-implemented utility function is increased traffic in the case of click-thrus on hyperlinked keywords.

13. The method of claim 1 wherein the computer-implemented utility function allocates a fixed budget among the bids for the plurality of biddable items.

14. The method of claim 1 wherein the auction has a minimum bidding increment and the determining a bid amount selected to achieve a given ranking selects a bid more than one increment greater than a nearest bid below.

15. The method of claim 1 wherein the computer-implemented utility function is based on an aggregate value to multiple users.

16. A computer system comprising:
a processor;
a memory; and
a set of instructions stored in and retrievable and executable by the processor for computing the memory for computing via the processor a plurality of optimized bid amounts over a plurality of biddable items wherein for a biddable item the auction offers a ranking for received bids according to bid amounts;
and a set of instructions comprising computer instructions for determining a bid amount for each ranking for each selectable biddable item from the current bids for the biddable item based on calculating of a given computer-implemented utility function retrievable by the processor from the memory and executable by the processor, subjectively formulated for a bidder; and
wherein the set of instructions include instructions for calculating of the utility function, comprising estimating the ranking of a bid amount for a first biddable item, estimating the ranking of a second biddable item, and comparing the estimated incremental effect of obtaining a higher estimated ranking for the first biddable item with estimated incremental effect of obtaining a higher estimated ranking of the second biddable item; and
submitting for the given bidder the plurality of bid amounts to an operator of an auction.

17. The system of claim 16 further comprising a set of instructions for submitting the plurality of optimized bid amounts to an operator of an auction.

18. The computer system of claim 16 wherein the set of instructions for computing a plurality of optimized bid amounts implements a greedy knapsack algorithm.

19. The computer system of claim 16 wherein the set of instructions for determining a bid amount for each ranking implements an extended Kalman filter.

20. A tangible, computer-readable medium for use in bidding on auction items that allows for a desired optimization of bid amounts over a plurality of biddable items wherein for a biddable item the auction offers a ranking for one or more received bids according to bid amounts, the system having computer-implemented functions which, when executed by a processor performs the following steps:
determining a plurality of current bids for the plurality of biddable items; and
calculating via the processor a plurality of bid amounts for a bidder for each selected biddable item based on a given computer-implemented utility function retrievable by the processor from a memory and executable by the processor, subjectively formulated for the bidder wherein the calculating comprises:
estimating the ranking of a bid amount for a first biddable item,
estimating the ranking of a bid amount for a second biddable item, and
comparing the estimated incremental effect of obtaining a higher estimated ranking for the first biddable item with estimated incremental effect of obtaining a higher estimated ranking for the second biddable item.

21. A computer implemented bidding method for use in bidding on auction items that allows for a desired optimization of bid amounts over a plurality of biddable items comprising the following computer-implemented steps:
determining the current bids for the plurality of biddable items;
determining via a processor a plurality of bid amounts for the plurality of biddable items based on maximum profit or maximum return on investment to a bidder of the entire plurality of biddable items based on a cost of the successful bid and an estimated resale value wherein the determining comprises a set of instructions retrievable by the processor from a memory and executable by the processor for:
estimating the ranking of a bid amount for a first biddable item,
estimating the ranking of a bid amount for a second biddable item, and
comparing the estimated incremental effect of obtaining a higher estimated ranking for the first biddable item with estimated incremental effect of obtaining a higher estimated ranking for the second biddable item; and
submitting the plurality of bid amounts to an operator of the auction.

22. A computer-implemented bidding method for a plurality of biddable items offered at auction wherein for a biddable item the auction offers a ranking for one or more received bids according to bid amounts and the bidder has either placed a non-zero current bid and has a current rank for each biddable item or is assumed to have placed a zero bid and has the lowest rank comprising:

determining all current bids for each biddable item in the plurality of biddable items;

determining the bidder's current bid if the bidder has a current bid for each biddable item in the plurality of biddable items via a set of instructions retrievable by a processor from a memory and executable by the processor;

calculating an estimated benefit to the bidder of increasing the bidder's current rank by one if the bidder has a current bid or assuming the lowest rank if the bidder has no current bid, the calculating being for each biddable item in the plurality of biddable items via a set of instructions retrievable by the processor from the memory and executable by the processor;

calculating an estimated cost to the bidder of increasing the bidder's current rank by one if the bidder has a current bid or assuming the lowest rank if the bidder has no current bid, the calculating being for each biddable item in the plurality of biddable items via a set of instructions retrievable by the processor from the memory and executable by the processor;

selecting a biddable item from among the plurality of biddable items, wherein the selected biddable item has the highest total of estimated benefit minus estimated cost, the selecting considering each biddable item in the plurality of biddable items via a set of instructions retrievable by the processor from the memory and executable by the processor;

calculating a selected bid to increase the bidder's current rank by one if the bidder has a current bid or assume the lowest rank if the bidder has no current bid via a set of instructions retrievable by the processor from the memory and executable by the processor;

estimating the ranking of a bid amount for a first biddable item, estimating the ranking of a second biddable item, and comparing the estimated incremental effect of obtaining a higher estimated ranking for the first biddable item with estimated incremental effect of obtaining a higher estimated ranking of the second biddable item via a set of instructions retrievable by the processor from the memory and executable by the processor; and submitting the selected bid for the selected biddable item to the auction via a set of instructions retrievable by the processor from the memory and executable by the processor.

23. A computer system comprising a tangible, computer-readable medium with a set of executable instructions for bidding on a plurality of biddable items offered at an auction wherein for a biddable item the auction offers a ranking for one or more received bids according to bid amounts and the bidder has either placed a non-zero current bid and has a current rank for each biddable item or is assumed to have placed a zero bid and has the lowest rank, comprising:

a processor;
a memory;
a set of instructions retrievable by the processor from the memory and executable by the processor for determining all current bids for each biddable item in the plurality of biddable items;

a set of instructions retrievable by the processor from the memory and executable by the processor for determining the bidder's current bid if the bidder has a current bid for each biddable item in the plurality of biddable items;

a set of instructions retrievable by the processor from the memory and executable by the processor for calculating an estimated benefit to the bidder of increasing the bidder's current rank by one if the bidder has a current bid or assuming the lowest rank if the bidder has no current bid, the calculating being for each biddable item in the plurality of biddable items;

a set of instructions retrievable by the processor from the memory and executable by the processor for calculating an estimated cost to the bidder of increasing the bidder's current rank by one if the bidder has a current bid or assuming the lowest rank if the bidder has no current bid, the calculating being for each biddable item in the plurality of biddable items;

a set of instructions retrievable by the processor from the memory and executable by the processor for selecting a biddable item from among the plurality of biddable items, wherein the selected biddable item has the highest total of estimated benefit minus estimated cost, the selecting considering each biddable item in the plurality of biddable items;

a set of instructions retrievable by the processor from the memory and executable by the processor for calculating a selected bid to increase the bidder's current rank by one if the bidder has a current bid or assume the lowest rank if the bidder has no current bid;

a set of instructions retrievable by the processor from the memory and executable by the processor for estimating the ranking of a bid amount for a first biddable item, estimating the ranking of a second biddable item, and comparing the estimated incremental effect of obtaining a higher estimated ranking for the first biddable item with estimated incremental effect of obtaining a higher estimated ranking of the second biddable item; and a set of instructions retrievable by the processor from the memory and executable by the processor for submitting the selected bid for the selected biddable item to the auction.

24. A computer implemented bidding method for use in bidding on auction items that allows for a desired optimization of bid amounts over a plurality of biddable items in auctions that provide a benefit commensurate to a ranking for received bids according to bid amounts:

defining a utility function based on a given computer-implemented utility function retrievable by a processor from a memory and executable by the processor selected from the group comprising maximizing profit from a given budget, maximizing traffic to the operator's site, maximizing redirects from the operator's site to another site, and maximizing the number of page views on the operator's site;

calculating a plurality of bid amounts for achieving a desired optimized outcome for the plurality of bid amounts wherein the calculating comprises comparing the utility of different rankings of a first biddable item with rankings of a second biddable item via a set of instructions retrievable by the processor from the memory and executable by the processor; and submitting for a bidder the plurality of bid amounts to an operator of an auction.

* * * * *